US008822614B2

(12) United States Patent
Yonemura et al.

(10) Patent No.: US 8,822,614 B2
(45) Date of Patent: Sep. 2, 2014

(54) ACRYLIC THERMOPLASTIC RESIN AND MOLDED OBJECT THEREOF

(75) Inventors: Masami Yonemura, Tokyo (JP); Mayuko Kimura, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/697,237

(22) PCT Filed: May 27, 2011

(86) PCT No.: PCT/JP2011/062283
§ 371 (c)(1),
(2), (4) Date: Nov. 9, 2012

(87) PCT Pub. No.: WO2011/149088
PCT Pub. Date: Dec. 1, 2011

(65) Prior Publication Data
US 2013/0072651 A1    Mar. 21, 2013

(30) Foreign Application Priority Data
May 28, 2010   (JP) ................................ 2010-123065

(51) Int. Cl.
C08F 232/04 (2006.01)
C08F 226/06 (2006.01)
C08F 222/40 (2006.01)

(52) U.S. Cl.
USPC ............ 526/262; 526/312; 526/260; 526/258

(58) Field of Classification Search
USPC .................................. 526/262, 312, 260, 258
See application file for complete search history.

(56) References Cited

U.S. PATENT DOCUMENTS

| | | | |
|---|---|---|---|
| 7,001,967 B2 * | 2/2006 | Toyomasu et al. ......... | 526/348.7 |
| 7,842,740 B2 | 11/2010 | Koike | |
| 2009/0311526 A1 | 12/2009 | Asai et al. | |
| 2011/0009585 A1 * | 1/2011 | Yonemura et al. ............ | 526/269 |

FOREIGN PATENT DOCUMENTS

| | | |
|---|---|---|
| JP | H02-017511 A | 1/1990 |
| JP | 2569773 B | 5/1990 |
| JP | H04-076013 A | 3/1992 |
| JP | H05-117334 A | 5/1993 |
| JP | H05-301930 A | 11/1993 |
| JP | H06-025359 A | 2/1994 |
| JP | H06-242301 A | 9/1994 |
| JP | H07-196745 A | 8/1995 |
| JP | H9-091753 A | 4/1997 |
| JP | 2886893 B2 | 4/1999 |
| JP | 2001-294722 A | 10/2001 |
| JP | 4424636 B | 10/2001 |
| JP | 2006-308682 A | 11/2006 |
| JP | 2009-293021 A | 12/2009 |
| JP | 4424636 B2 * | 3/2010 |
| JP | 2011-038053 A | 2/2011 |
| JP | 2012-233180 A | 11/2012 |
| WO | 2009/084541 A1 | 7/2009 |
| WO | WO 2009084541 A1 * | 7/2009 |

OTHER PUBLICATIONS

International Preliminary Report on Patentability and Written Opinion issued in International Patent Application No. PCT/JP2011/062283 dated Jan. 8, 2013.
Yoshimi et al., "Kagaku Sosetu, No. 39," Gakkai Shuppan Senta (1988).
Miyatake, "Monthly Display, April," Techno Times Co., Ltd. (2005).
Tagaya et al., "Design of Zero Zero-birefringence Polymers for Injection Molded Products with Low Birefringence," Seikei-Kakou, 21: 426-435 (2009).
Tagaya et al., "Zero-Birefringence Optical Polymers," Macromolecules, 39: 3019-3023 (2006).
Search Report issued in corresponding International Application No. PCT/JP2011/062283 dated Jul. 19, 2011.
European Search Report issued in counterpart European Patent Application No. 11786785.3 dated May 14, 2014.

* cited by examiner

Primary Examiner — Ling Choi
Assistant Examiner — David L Miller
(74) Attorney, Agent, or Firm — Morgan, Lewis & Bockius LLP

(57) ABSTRACT

The present invention provides an acrylic thermoplastic resin containing 50 to 95% by mass of a repeating unit (X) derived from a methacrylate monomer represented by the following formula (1), 0.1 to 20% by mass of a repeating unit (Y1) derived from an N-substituted maleimide monomer (a) represented by the following formula (2), and 0.1 to 49.9% by mass of a repeating unit (Y2) derived from an N-substituted maleimide monomer (b) represented by the following formula (3), regarding the total amount of the repeating unit (X), the repeating unit (Y1), and the repeating unit (Y2) as 100% by mass:

[Chemical Formula 1]

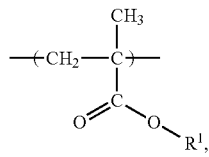

formula (1)

[Chemical Formula 2]

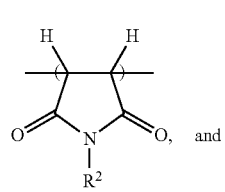

formula (2)

and

[Chemical Formula 3]

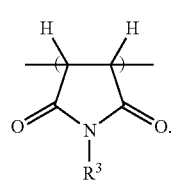

formula (3)

The absolute value of a photoelastic coefficient (C) of the acrylic thermoplastic resin is not greater than $3.0 \times 10^{-12}\,\text{Pa}^{-1}$. The halogen atom content is less than 0.47% by mass with reference to the mass of the acrylic thermoplastic resin.

18 Claims, 2 Drawing Sheets

(b) COMPARATIVE EXAMPLE16

(a) EXAMPLE39

ACRYLIC THERMOPLASTIC RESIN AND MOLDED OBJECT THEREOF

TECHNICAL FIELD

The present invention relates to an acrylic thermoplastic resin having excellent transparency and excellent in heat resistance, weather resistance, and low water absorbency, in which birefringence thereof is highly controlled, and to a molded object including the same.

BACKGROUND ART

Examples of transparent optical materials include methacrylic resins represented by methyl methacrylate homopolymer (PMMA), polystyrene (PS), styrene/methyl methacrylate copolymer (MS), polycarbonate (PC) and the like.

In particular, methacrylic resins have been applied in such industrial fields as signboards, lighting covers, automotive parts, and ornaments because they are excellent in transparency, surface hardness, weather resistance, and the like and have good moldability. Because of small birefringence as an optical property, methacrylic resins have also been applied as optical resins for optical materials such as optical disks, optical films, and plastic substrates.

However, in recent years, with the development of various optical products, for example, flat panel displays such as liquid crystal displays, plasma displays, and organic EL displays, small infrared sensors, micro-optical waveguides, microlenses, and pick-up lenses for DVD/Blue Ray Disks handling short-wavelength light, not only excellent transparency but also high heat resistance and weather resistance, dimensional stability during moisture absorption, and control of birefringence have been required for optical resins for optical materials.

Recently, as a result of sophistication of various optical products as described above, in addition to the characteristics above, even higher homogeneity of optical properties have been required for optical materials. Specifically, in a case of a polarizing plate protective film used for a liquid crystal polarizing plate, an optical material having smaller birefringence (=retardation) even with the same total light transmittance is required. On the other hand, in a case of a quarter wave plate having a function of converting linear polarization by a polarizing plate into circularly polarized light, an optical material intended to exhibit birefringence (=retardation) of a required magnitude is required. For this purpose, it becomes necessary to control birefringence (positive/negative/zero) of an optical material or to prevent birefringence distribution in an optical material.

For example, with increase in size of flat panel displays, the display screens are more often viewed not only from the front but also sideways. In such a case, in principle, the displays have the problem of display color change or contrast reduction depending on the angle at which they are viewed. In order to improve the viewing angle characteristic, there is a demand for optical films and for a technique that controls birefringence of optical films to almost zero or to a significant positive or negative value.

As a result of the increase in size of flat display panels, the required optical materials are also increased in size. Due to biased external forces, birefringence distribution takes place in the optical materials, causing contrast reduction. Thus, an optical material having a small birefringence change caused by external forces, that is, a small absolute value of a photoelastic coefficient, has been demanded for reducing birefringence distribution (Non Patent Literatures 1 and 2).

As a related art for controlling the intrinsic birefringence of optical resins, for example, Patent Literature 1 discloses a copolymer composed of 70 to 85% by mass of a methyl methacrylate monomer unit and 15 to 30% by mass of one or two or more N-substituted maleimide monomer units, and an optical element thereof. Example of Patent Literature 1 discloses a ternary copolymer of methyl methacrylate, N-cyclohexylmaleimide, and N-o-chlorophenylmaleimide (MMA/CyMI/ClPheMI=77/20/3 wt %) and shows that intrinsic birefringence thereof is extremely small. The description contains a mention of a method of reducing optical inhomogeneity in a molded object, in which the objective is achieved by selecting a particular copolymer composition and minimizing intrinsic birefringence. On the other hand, Non Patent Literature 3 suggests that birefringence of a molded object as the optical homogeneity should include not only intrinsic birefringence of the resin used therein but also birefringence developed as a result of molding such as injection molding or extrusion molding. Specifically, according to the description that, when lenses or optical disks are obtained by injection molding, although (orientation) birefringence that reflects intrinsic birefringence can be reduced by 1) minimizing the intrinsic birefringence and by 2) selecting process conditions, birefringence distribution (=optical inhomogeneity) generally exists in a molded object because (photoelastic) birefringence remains in the vicinity of the gate due to stress strain caused by a flow of polymer chains during molding. That is, there is no disclosure that it is necessary to minimize intrinsic birefringence and to minimize a photoelastic coefficient in order to increase the optical homogeneity. There is no description as to optically perfect isotropy, either. That is, in order to increase optical homogeneity, it is additionally necessary to develop a method of minimizing a photoelastic coefficient.

Other techniques for controlling intrinsic birefringence include, for example, Patent Literatures 2 and 3. Patent Literature 2 discloses a copolymer composed of 89 to 40% by mass of a methyl methacrylate unit, 10 to 30% by mass of an aromatic vinyl compound unit, and 1 to 50% by mass of a maleimide or N-substituted maleimide unit, and a retarder plate thereof Example in Patent Literature 2 shows that a drawn sheet of a ternary copolymer of methyl methacrylate, styrene, and N-cyclohexylmaleimide (MMA/St/CyMI=80/10/10 wt %) has retardation, with small retardation unevenness, and is excellent in solvent resistance. However, the photoelastic coefficient thereof is still large and the birefringence is also large. There is no description as to optically perfect isotropy for minimizing birefringence and photoelastic coefficient at the same time.

Patent Literature 3 discloses a copolymer of 45 to 85% by mass of a (meth)acrylic acid ester unit, 10 to 40% by mass of an aromatic vinyl compound unit, and 5 to 20% by mass of an aromatic maleimide unit, and an optical drawn film thereof, in which the content of the aromatic vinyl compound unit is greater than the content of the aromatic maleimide unit. Example in Patent Literature 3 shows that a successive biaxially drawn film of a ternary copolymer of methyl methacrylate, styrene, and N-phenylmaleimide (MMA/St/PheMI=70/20/10 wt %) exhibits large negative retardation and is excellent in thermal decomposition resistance. However, photoelastic coefficient and birefringence thereof are large. There is no description as to optically perfect isotropy.

As a related art for controlling a photoelastic coefficient, for example, Patent Literature 4 discloses a method of adjusting a photoelastic coefficient to zero by combining a monomer having a photoelastic coefficient with the positive sign and a monomer with the negative sign. Specifically, Patent Literature 4 discloses a method of combining methyl methacrylate, which is a monomer having a photoelastic coefficient with the negative sign, with an unsaturated double bond-containing compound, which is a monomer having a photoelastic coefficient with the positive sign, and in which the sign of the photoelastic coefficient of a homopolymer formed is opposite to that of poly(methyl methacrylate). Patent Literature 4 describes that polystyrene, polycarbonate, a styrene/methyl methacrylate copolymer, etc., have an aromatic ring in a molecule and thus easily cause orientation strain or birefringence. Then, the listed examples of the monomer having a photoelastic coefficient with the positive sign include aliphatic hydrocarbon group methacrylates such as dodecyl methacrylate, alicyclic hydrocarbon group methacrylates such as cyclohexyl methacrylate, tricyclodecyl methacrylate, and cyclododecyl methacrylate, N-aliphatic hydrocarbon group-substituted maleimides such as N-ethylmaleimide, and N-alicyclic hydrocarbon group-substituted maleimides such as N-cyclohexylmaleimide. That is, Patent Literature 4 contains no description that suggests the characteristics of methacrylates such as benzyl methacrylate having a substituent containing an aromatic group or N-substituted maleimides such as N-phenylmaleimide, and the effects of copolymers thereof. Example in Patent Literature 4 discloses a binary copolymer of methyl methacrylate and N-cyclohexylmaleimide (MMA/CyMI=80/20 wt %) and shows that the absolute value of photoelastic coefficient thereof is less than $1.0 \times 10^{-12}$ $Pa^{-1}$. However, the copolymer has a glass transition temperature (Tg) as low as 110° C. and is insufficient in heat resistance. There is no description as to optically perfect isotropy, either.

Patent Literature 5 discloses a composition of a copolymer of 98 to 50% by mass of a methacrylate unit, 1 to 20% by mass of an arylmaleimide unit, 1 to 30% by mass of an alkylmaleimide unit, and 0 to 15% by mass of any other monomer unit, and a rubber-modified thermoplastic resin. Example in Patent Literature 5 only discloses a quarterpolymer of methyl methacrylate, styrene, N-phenylmaleimide, and N-cyclohexylmaleimide, as a copolymer. The description of Patent Literature 5 mentions that it is preferable to combine N-phenylmaleimide and N-cyclohexylmaleimide in order to improve the phase solubility with the rubber-modified thermoplastic resin, and that adjustment of the refractive index of the quarterpolymer is necessary so that the refractive index difference between a matrix portion mainly composed of the quarterpolymer and the rubber portion should be 0.01 or less in order to obtain excellent transparency. However, there is no mention as to the optical properties (intrinsic birefringence, photoelastic coefficient), and there is no suggestion as to birefringence control and photoelastic coefficient control nor description as to optically perfect isotropy. There is also a problem of a large photoelastic coefficient of the copolymer.

As a related art for optically perfect isotropy for minimizing birefringence and photoelastic coefficient at the same time, for example, Non Patent Literatures 3 and 4 disclose a methyl methacrylate/methacrylic acid-2,2,2-trifluoroethyl/benzyl methacrylate ternary copolymer (=52/42/6 wt %). There has been a problem in that this acrylic thermoplastic resin is insufficient in heat resistance although birefringence and photoelastic coefficient thereof can be controlled at the same time and the absolute values of birefringence and photoelastic coefficient thereof can be controlled to zero at the same time (zero-zero birefringence).

Patent Literature 6 discloses a quarterpolymer of methyl methacrylate, styrene, maleic anhydride, and benzyl methacrylate (MMA/St/MAH/BzMA=60/12/27/1 wt %) as an acrylic thermoplastic resin exhibiting optically perfect isotropy and high heat resistance. However, there has been a problem in that the long-time stability of optical properties is low in hot and humid environments (80° C., 90% RH).

As other related arts, for example, Patent Literatures 7 to 9 disclose a ternary copolymer of methyl methacrylate, N-cyclohexylmaleimide, and benzyl methacrylate. There has been a problem in that this acrylic thermoplastic resin is not always sufficient in heat resistance although low birefringence can be controlled to some degree.

In summary, in the range of related arts, there exists no technique that can provide an acrylic thermoplastic resin excellent in heat resistance, weather resistance, and low water absorbency, in which birefringence thereof (birefringence and photoelastic coefficient) serving as an optical property is highly controlled.

CITATION LIST

Patent Literatures

Patent Literature 1: Japanese Patent Application Laid-Open Publication No. 06-242301
Patent Literature 2: Japanese Patent Publication No. 2886893
Patent Literature 3: Japanese Patent Application Laid-Open Publication No. 2011-38053
Patent Literature 4: Japanese Patent Application Laid-Open Publication No. 04-76013
Patent Literature 5: Japanese Patent Publication No. 4424636
Patent Literature 6: International Publication No. 2010/084541
Patent Literature 7: Japanese Patent Application Laid-Open Publication No. 06-25359
Patent Literature 8: Japanese Patent Publication No. 2659773
Patent Literature 9: Japanese Patent Application Laid-Open Publication No. 02-17511

Non Patent Literatures

Non Patent Literature 1: Chemical Review, No. 39, 1988 (published by Japan Scientific Societies Press)
Non Patent Literature 2: Monthly Display, April issue, 2005
Non Patent Literature 3: Journal of the Japan Society of Polymer Processing, p. 426, No. 7, Vol. 21, 2009
Non Patent Literature 3: Macromolecules, 2006, 39, 3019-3023

SUMMARY OF INVENTION

Technical Problem

An objective of the present invention is to provide an acrylic thermoplastic resin having excellent transparency and excellent in heat resistance, weather resistance, and low water absorbency, in which birefringence thereof is highly controlled. Another objective of the present invention is to provide a molded object formed of the acrylic thermoplastic resin.

Solution to Problem

The present invention is made based on that it was found for the first time that an acrylic polymer containing repeating units derived from particular three monomers exhibits unique optical properties when having a particular composition. Specifically, the present invention is made by finding that a particular acrylic thermoplastic resin is excellent in transparency as well as heat resistance, weather resistance, and low water absorbency and the birefringence thereof can be highly controlled while the preferred characteristics described above are maintained.

Specifically, the present invention relates to the following:

[1] An acrylic thermoplastic resin contains 50 to 95% by mass of a repeating unit (X) derived from a methacrylate monomer represented by the following formula (1), 0.1 to 20% by mass of a repeating unit (Y1) derived from an N-substituted maleimide monomer (a) represented by the following formula (2), and 0.1 to 49.9% by mass of a repeating unit (Y2) derived from an N-substituted maleimide monomer (b) represented by the following formula (3), regarding the total amount of the repeating unit (X), the repeating unit (Y1), and the repeating unit (Y2) as 100% by mass:

[Chemical Formula 1]

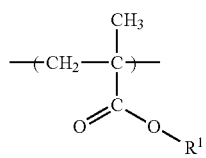

formula (1)

(where $R^1$ represents a chemical group selected from the group consisting of a hydrogen atom, a linear or branched alkyl group having 1 to 12 carbon atoms, a cycloalkyl group having 5 to 12 carbon atoms, an aryl group having 6 to 14 carbon atoms, and an aryl group having 6 to 14 carbon atoms having a substituent, $R^1$ in the same molecule being optionally the same or different; the substituent of the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms),

[Chemical Formula 2]

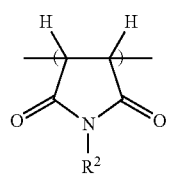

formula (2)

(where $R^2$ represents an aryl group having 6 to 14 carbon atoms or an aryl group having 6 to 14 carbon atoms and having a substituent, $R^2$ in the same molecule being optionally the same or different; the substituent of the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms), and

[Chemical Formula 3]

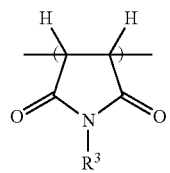

formula (3)

(where $R^3$ represents a chemical group selected from the group consisting of a hydrogen atom, a linear or branched alkyl group having 1 to 12 carbon atoms, an alkyl group having 1 to 12 carbon atoms and having a substituent, and a cycloalkyl group having 3 to 12 carbon atoms, $R^3$ in the same molecule being optionally the same or different; the substituent of the alkyl group is one selected from the group consisting of a halogen atom, a hydroxyl group, a nitro group, and a linear or branched alkoxy group having 1 to 12 carbon atoms).

The absolute value of a photoelastic coefficient (C) is not greater than $3.0 \times 10^{-12}$ $Pa^{-1}$, and the halogen atom content is less than 0.47% by mass with reference to the mass of the acrylic thermoplastic resin.

[2] In the acrylic thermoplastic resin according to claim 1, a molar ratio of the content of the repeating unit (Y1) derived from an N-substituted maleimide monomer (a) to the content of the repeating unit (Y2) derived from an N-substituted maleimide monomer (b) is greater than 0 and not greater than 15.

[3] In the acrylic thermoplastic resin according to [1] or [2], the repeating unit (X) derived from a methacrylate monomer is a repeating unit derived from methyl methacrylate or benzyl methacrylate, the repeating unit (Y1) derived from an N-substituted monomer (a) is a repeating unit derived from N-phenylmaleimide, and the repeating unit (Y2) derived from an N-substituted maleimide monomer (b) is a repeating unit derived from N-cyclohexylmaleimide.

[4] The acrylic thermoplastic resin according to any one of [1] to [3] has a weight-average molecular weight in a range of 3000 to 1000000 according to a GPC measurement method.

[5] The acrylic thermoplastic resin according to any one of [1] to [4] satisfies the following optical property:

a value of a slope K in an equation (A) of linear relationship between birefringence ($\Delta n(S)$) of a uniaxially drawn film of the acrylic thermoplastic resin and a draw rate (S) determined by least squares approximation satisfying the following expression (B):

$$\Delta n(S) = K \times S + C \text{ (}C \text{ is a constant that is a birefringence value when the film is not drawn)} \quad (A)$$

$$[K] = \leq 0.30 \times 10^{-6} \quad (B)$$

(the birefringence is a value obtained by converting a value measured from the film of the acrylic thermoplastic resin into a value in terms of a 100-μm thickness).

[6] The acrylic thermoplastic resin according to any one of [1] to [5] satisfies the following optical property (i):

(i) the absolute value of retardation (Re) in an in-plane direction is not greater than 30 nm (the retardation is a value obtained by converting a value measured from a film of the acrylic thermoplastic resin into a value in terms of a 100-μm thickness).

[7] The acrylic thermoplastic resin according to any one of [1] to [6] satisfies the following optical property (ii):

(ii) the absolute value of retardation (Rth) in a thickness direction is not greater than 30 nm (the retardation is a value obtained by converting a value measured from a film of the acrylic thermoplastic resin into a value in terms of a 100-μm thickness).

[8] The acrylic thermoplastic resin according to any one of [1] to [7] satisfies the following condition (iii):

(iii) glass transition temperature (Tg) is not lower than 120° C.

[9] The acrylic thermoplastic resin according to any one of [1] to [8] satisfies the following condition (iv):

(iv) total light transmittance is not lower than 85%.

[10] A molded object is made of the acrylic thermoplastic resin according to any one of [1] to [9].

[11] A sheet or film is made of the molded object according to [10].

[12] The sheet or film according to [11] is molded by extrusion molding and drawn in at least a uniaxial direction with a draw rate of 0.1 to 300%.

[13] The sheet or film according to [11] is molded by solution cast molding and drawn in at least a uniaxial direction with a draw rate of 0.1 to 300%.

[14] A polarizing plate protective film is formed of the sheet or film according to any one of [11] to [13].

[15] A retarder film is formed of the sheet or film of any one of [11] to [13].

[16] A retarder plate is formed of the sheet or film according to any one of [11] to [13].

[17] A transparent plastic substrate is formed of the sheet or film according to any one of [11] to [13].

[18] A lens is formed of the molded object according to [11].

Advantageous Effects of Invention

The present invention can provide an acrylic thermoplastic resin having excellent transparency and excellent in heat resistance, weather resistance, and low water absorbency, in which birefringence thereof is highly controlled. The present invention can also provide a molded object formed of the acrylic thermoplastic resin.

DESCRIPTION OF EMBODIMENTS

Figure 1:
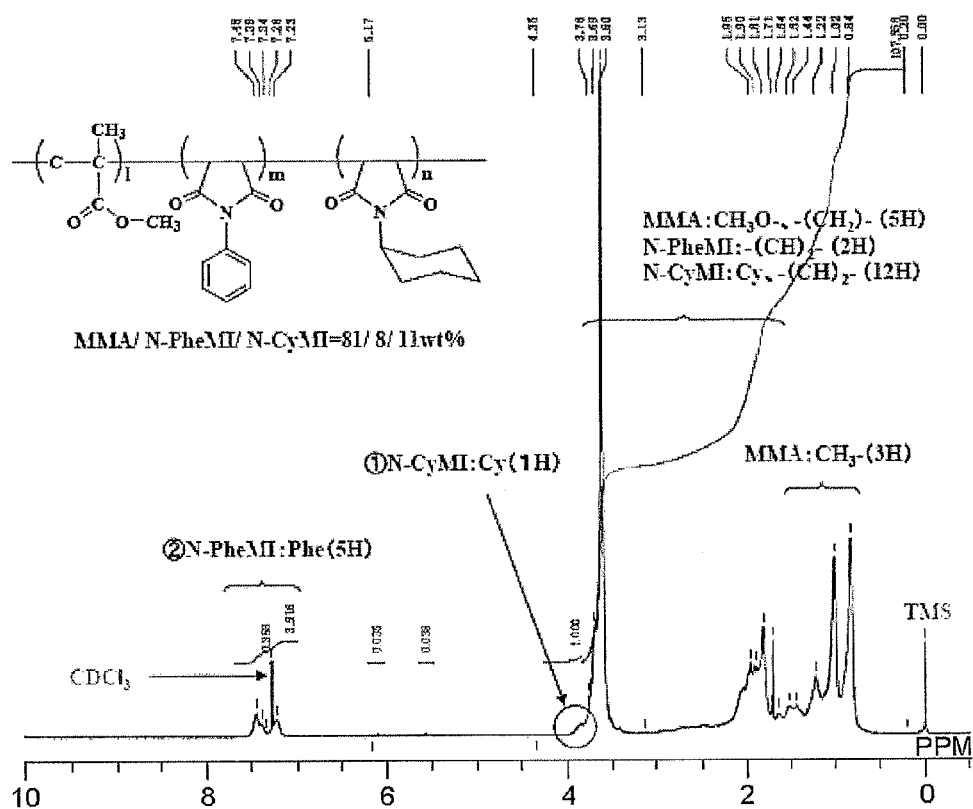
FIG. 1 is a $^1$H-NMR spectrum chart of an acrylic thermoplastic resin (Example 1).

Preferred embodiments of the present invention will be described below. However, the present invention is not limited to the following embodiments.

[Acrylic Thermoplastic Resin]

An acrylic thermoplastic resin according to the present embodiment contains a repeating unit (X) derived from a methacrylate monomer represented by the following formula (1), a repeating unit (Y1) derived from an N-substituted maleimide monomer (a) represented by the following formula (2), and a repeating unit (Y2) derived from an N-substituted maleimide monomer (b) represented by the following formula (3).

[Chemical Formula 4]

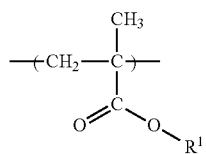

formula (1)

In the formula (1), $R^1$ represents a chemical group selected from the group consisting of a hydrogen atom, a linear or branched alkyl group having 1 to 12 carbon atoms, a cycloalkyl group having 5 to 12 carbon atoms, an aryl group having 6 to 14 carbon atoms, and an aryl group having 6 to 14 carbon atoms and having a substituent, where a plurality of $R^1$ in the same molecule may be the same or different. The substituent of the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms.

[Chemical Formula 5]

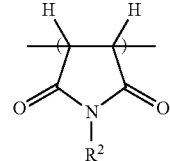

formula (2)

In the formula above, $R^2$ represents an aryl group having 6 to 14 carbon atoms or an aryl group having 6 to 14 carbon atoms and having a substituent, where a plurality of $R^2$ in the same molecule may be the same or different. The substituent of the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms.

[Chemical Formula 6]

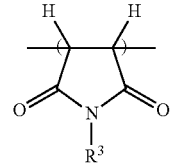

formula (3)

In the formula (3), $R^3$ represents a hydrogen atom, a linear or branched alkyl group having 1 to 12 carbon atoms, an alkyl group having 1 to 12 carbon atoms and having a substituent, or a cycloalkyl group having 3 to 12 carbon atoms, where a plurality of $R^3$ in the same molecule may be the same or different. The substituent of the alkyl group is one selected from the group consisting of a halogen atom, a hydroxyl group, a nitro group, and a linear or branched alkoxy group having 1 to 12 carbon atoms.

The acrylic thermoplastic resin according to the present embodiment is different from the conventional known techniques and contains, as essential components, the repeating unit (X) derived from a methacrylate monomer represented by the formula (1), the repeating unit (Y1) derived from an N-substituted maleimide monomer (a), and the repeating unit (Y2) derived from an N-substituted maleimide monomer (b). As the effect, an acrylic thermoplastic resin having excellent transparency and being excellent in heat resistance, weather resistance, and low water absorbency can be obtained. As another effect, the optical properties described later (birefringence and photoelastic coefficient) can be highly controlled to a significant value (positive/negative/zero). In an acrylic thermoplastic resin that includes only one of the repeating unit (Y1) and the repeating unit (Y2) as a repeating unit derived from an N-substituted maleimide monomer, the properties described above are insufficient, and moreover, the control of the optical properties falls outside a satisfactory range.

In the acrylic thermoplastic resin according to the present embodiment, the repeating unit (X) represented by the formula (1) is derived from a methacrylic acid monomer or a methacrylate monomer. Examples of the methacrylate include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate; cyclopentyl methacrylate, cyclohexyl methacrylate, cyclooctyl methacrylate, tricyclodecyl methacrylate, bicyclooctyl methacrylate, tricyclododecyl methacrylate, isobornyl methacrylate; phenyl methacrylate, benzyl methacrylate, 1-phenylethyl methacrylate, 2-phenoxyethyl methacrylate, 3-phenylpropyl methacrylate, and 2,4,6-tribromophenyl methacrylate. These methacrylic acid and methacrylates may be used alone or in combination of two or more of them.

Of theses methacrylates, methyl methacrylate is preferable because the resultant acrylic thermoplastic resin is excellent in transparency and weather resistance. 2,4,6-tribromophenyl methacrylate is preferable because flame resistance is imparted.

The content ($X_{wt}$) of the repeating unit (X) represented by the formula (1) is 50 to 95% by mass because an amount superior to other repeating units should be included in order to maintain the excellent transparency, weather resistance, and mechanical characteristics of the methacrylic resin. $X_{wt}$ is preferably 60 to 95% by mass, more preferably 65 to 90% by mass, even more preferably 70 to 90% by mass, and most preferably 70 to 85% by mass. When $X_{wt}$ falls within these ranges, the resultant acrylic thermoplastic resin is excellent in transparency, weather resistance, and mechanical characteristics, and the preferred heat resistance-improving effect can be obtained.

As for the optical property (in-plane retardation (Re)) described later, the content ($X_{wt}$) of the repeating unit (X) represented by the formula (1) is preferably not less than 80% by mass and not more than 95% by mass in order that the acrylic thermoplastic resin according to the present embodiment can have negative retardation. On the other hand, the content ($X_{wt}$) of the repeating unit (X) represented by the formula (1) is preferably not less than 50% by mass and less than 80% by mass in order that the acrylic thermoplastic resin according to the present embodiment can have positive retardation.

The content ($X_{wt}$) of the repeating unit (X) represented by the formula (1) is preferably not less than 65% by mass and not more than 95% by mass so that the absolute value of in-plane retardation (Re) of the acrylic thermoplastic resin according to the present embodiment should be not greater than 30 nm. The content ($X_{wt}$) of the repeating unit (X) represented by the formula (1) is preferably not less than 70% by mass and not more than 90% by mass so that the absolute value of in-plane retardation (Re) of the acrylic thermoplastic resin according to the present embodiment should be not greater than 20 nm. It is noted that the retardation is a value obtained by converting the value measured from a film obtained by molding the acrylic thermoplastic resin into a value in terms of a film thickness of 100 μm.

In a case where a methacrylate monomer having an aromatic group, for example, benzyl methacrylate or 2,4,6-tribromophenyl methacrylate is used in combination with a methyl methacrylate monomer, the content of the repeating unit derived from the methacrylate having an aromatic group is preferably 0.1 to 10% by mass, more preferably 0.1 to 8% by mass, and even more preferably 0.1 to 6% by mass from the viewpoint of heat resistance and optical properties such as birefringence. When the content of the repeating unit derived from a methacrylate monomer having an aromatic group falls within these ranges, the resultant acrylic thermoplastic resin achieves the effect of improving optical properties such as birefringence without a significant reduction in heat resistance.

The N-substituted maleimide monomer (a) from which the repeating unit (Y1) represented by the formula (2) is derived is, for example, at least one kind selected from the group consisting of N-phenylmaleimide, N-benzylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-metoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, and N-anthracenylmaleimide.

Among these N-substituted maleimide monomers (a), N-phenylmaleimide and N-benzylmaleimide are preferred because heat resistance and optical properties such as birefringence of the resultant acrylic thermoplastic resin are excellent. Furthermore, N-(2,4,6-tribromophenyl)maleimide is preferred because flame resistance can be imparted.

The content ($Y1_{wt}$) of the repeating unit (Y1) is preferably 0.1 to 20% by mass from the viewpoint of heat resistance and optical properties. $Y1_{wt}$ is preferably 0.1 to 18% by mass, more preferably 0.1 to 16% by mass, and even more preferably 1 to 16% by mass.

On the other hand, the N-substituted maleimide monomer (b) from which the repeating unit (Y2) represented by the formula (3) is derived is, for example, at least one kind selected from the group consisting of N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclopentylmaleimide, N-cyclohexylmaleimide, N-cycloheptylmaleimide, and N-cyclooctylmaleimide.

Among these N-substituted maleimide monomers (b), N-methylmaleimide, N-ethylmaleimide, N-isopropylmaleimide, and N-cyclohexylmaleimide are preferred because the resultant acrylic thermoplastic resin is excellent in weather resistance and optical properties such as low birefringence. N-cyclohexylmaleimide is more preferred because low water absorbency can be imparted.

The content ($Y2_{wt}$) of the repeating unit (Y2) derived from the N-substituted maleimide monomer (b) is 0.1 to 49.9% by mass from the viewpoint of weather resistance, low water absorbency and optical properties such as transparency. $Y2_{wt}$ is preferably 0.1 to 40% by mass, more preferably 0.1 to 35% by mass, and even more preferably 1 to 30% by mass.

The content ($Y1_{wt}+Y2_{wt}$) of the sum of the repeating unit (Y1) derived from the N-substituted maleimide monomer (a) and the repeating unit (Y2) derived from the N-substituted maleimide monomer (b) in the acrylic thermoplastic resin according to the present embodiment is 5 to 50% by mass. $Y1_{wt}+Y2_{wt}$ is preferably 5 to 40% by mass, more preferably 10 to 35% by mass, even more preferably 10 to 30% by mass, and further more preferably 15 to 30% by mass. When $Y1_{wt}+Y2_{wt}$ falls within these ranges, the resultant acrylic thermoplastic resin achieves a sufficient heat resistance-improving effect and also achieves the preferred improvement effect in weather resistance, low water absorbency, and optical properties. When the proportion of ($Y1_{wt}+Y2_{wt}$) of the repeating units of the N-substituted maleimides exceeds 50% by mass, there is a problem that the reactivity of the monomer components is reduced during polymerization reaction to leave more monomers unreacted, so that the physical properties of the resultant acrylic thermoplastic resin are degraded.

In the acrylic thermoplastic resin according to the present embodiment, the molar ratio (Y1/Y2) (mol/mol) of the content of the repeating unit (Y1) derived from the N-substituted maleimide monomer (a) to the content of the repeating unit (Y2) derived from the N-substituted maleimide monomer (b) is preferably greater than 0 and not more than 15. Y 1/Y2 (mol/mol) is more preferably not more than 10 from the viewpoint of optical properties described later (low birefringence, low photoelastic coefficient). When Y1/Y2 (mol/mol) falls within this range, the acrylic thermoplastic resin of the present invention exhibits further better optical properties.

In the acrylic thermoplastic resin according to the present embodiment, the content of the sum of the repeating unit (X), the repeating unit (Y1) and the repeating unit (Y2) may be not less than 80% by mass with reference to the total mass of the acrylic thermoplastic resin.

The acrylic thermoplastic resin according to the present embodiment may have a repeating unit derived from any other monomer copolymerizable with the monomers above in a range that does not impair the objectives of the present invention. Examples of any other copolymerizable monomer include aromatic vinyl; unsaturated nitrile; acrylic acid ester having a cyclohexyl group, a benzyl group, or an alkyl group having 1 to 18 carbon atoms; olefin; diene; vinyl ether; vinyl ester; vinyl fluoride; allyl ester or methacryl ester of saturated fatty monocarboxylic acid such as allyl propionate; poly (meth)acrylate; polyarylate; glycidyl compound; and unsaturated carboxylic acids. Any other monomer may be one or a combination of two or more selected from these groups.

The acrylic thermoplastic resin may contain a repeating unit derived from an aromatic vinyl monomer represented by the following formula (4).

[Chemical Formula 7]

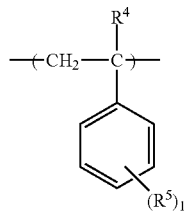

formula (4)

In the formula (4), $R^4$ and $R^5$ may be the same or different, and each is one selected from the group consisting of a hydrogen atom, a halogen atom, a hydroxyl group, a nitro group, a linear or branched alkoxy group having 1 to 12 carbon atoms, and a linear or branched alkyl group having 1 to 12 carbon atoms. 1 indicates an integer of 1 to 3.

The repeating unit represented by the formula (4) is derived from an aromatic vinyl monomer. The aromatic vinyl monomer includes, for example, one monomer selected from the group consisting of styrene, 2-methylstyrene, 3-methylstyrene, 4-methylstyrene, 2,4-dimethylstyrene, 2,5-dimethylstyrene, 2-methyl-4-chlorostyrene, 2,4,6-trimethylstyrene, α-methylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2-chlorostyrene, 3-chlorostyrene, 4-chlorostyrene, 2,4-dichlorostyrene, 2,6-dichlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene.

Among these monomers, styrene and α-methylstyrene are preferred because copolymerization is easy.

When the repeating unit represented by the formula (4) is contained, the moisture absorbency of the acrylic thermoplastic resin is further improved. In the case where the acrylic thermoplastic resin contains the repeating unit represented by the formula (4), the content thereof is preferably 0.1 to 20% by mass, more preferably 0.1 to 15% by mass, and even more preferably 0.1 to 10% by mass with reference to the total mass of the acrylic thermoplastic resin. The content of the repeating unit represented by the formula (4) is preferably less than 10% by mass and more preferably less than 7% by mass from the viewpoint of weather resistance.

The acrylic thermoplastic resin may contain a repeating unit derived from an N-substituted maleimide monomer represented by the following formula (5).

[Chemical Formula 8]

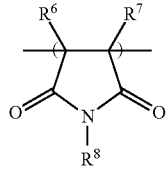

formula (5)

In the formula (5), $R^6$ and $R^7$ may be the same or different, and each represents a hydrogen atom or a linear or branched alkyl group having 1 to 12 carbon atoms. $R^8$ is a chemical group selected from the group consisting of a hydrogen atom, a linear or branched alkyl group having 1 to 12 carbon atoms, an alkyl group having 1 to 12 carbon atoms and having a substituent, a cycloalkyl group having 3 to 12 carbon atoms, an aryl group having 6 to 14 carbon atoms, and an aryl group having 6 to 14 carbon atoms and having a substituent, where $R^8$ in the same molecule may be the same or different. The substituent of the alkyl group and the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms.

The repeating unit represented by the formula (5) is derived from a monomer represented by the following formula (6). The monomer represented by the formula (6) includes, for example, one monomer selected from the group consisting of 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, 1,3,4-triphenyl-1H-pyrrole-2,5-dione, 1-cyclohexyl-3-methyl-1-phenyl-1H-pyrrole-2,5-dione, 1-cyclohexyl-3,4-dimethyl-1-phenyl-1H-pyrrole-2,5-dione, 1-cyclohexyl-3-phenyl-1H-pyrrole-2,5-dione, 1-cyclohexyl-3,4-diphenyl-1H-pyrrole-2,5-dione, and the like.

[Chemical Formula 9]

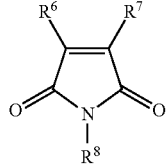

formula (6)

In the formula (6), $R^6$ and $R^7$ may be the same or different, and each represents a hydrogen atom or a linear or branched alkyl group having 1 to 12 carbon atoms. $R^8$ is a chemical group selected from the group consisting of a hydrogen atom, a linear or branched alkyl group having 1 to 12 carbon atoms, an alkyl group having 1 to 12 carbon atoms and having a substituent, a cycloalkyl group having 3 to 12 carbon atoms, an aryl group having 6 to 14 carbon atoms, and an aryl group having 6 to 14 carbon atoms and having a substituent, where $R^8$ in the same molecule may be the same or different. The substituent of the alkyl group and the aryl group is one selected from the group consisting of a halogen atom, a hydroxyl group, a nitro group, a linear or branched alkoxy group having 1 to 12 carbon atoms, and a linear or branched alkyl group having 1 to 12 carbon atoms.

Examples of the unsaturated nitrile monomer include acrylonitrile, methacrylonitrile, ethacrylonitrile, phenylacrylonitrile, and the like.

Examples of the acrylic acid ester include methyl acrylate, ethyl acrylate, propyl acrylate, isopropyl acrylate, butyl acrylate, isobutyl acrylate, tertiary-butyl acrylate, amyl acrylate, isoamyl acrylate, octyl acrylate, 2-ethylhexyl acrylate, decyl acrylate, lauryl acrylate, cyclohexyl acrylate, benzyl acrylate, and the like.

Examples of the olefin monomer include ethylene, propylene, isobutylene, diisobutylene, and the like. Examples of the diene monomer include butadiene, isoprene, and the like. Examples of the vinyl ether monomer include methyl vinyl ether, butyl vinyl ether, and the like. Examples of the vinyl ester monomer include vinyl acetate, vinyl propionate, and the like. Examples of the vinyl fluoride monomer include vinylidene fluoride and the like.

Examples of the poly(meth)acrylate monomer include ethylene glycol(meth)acrylate, diethylene glycol(meth)acrylate, divinylbenzene, diallyl phthalate, trimethylolpropane tri(meth)acrylate, hexanediol tri, pentaerythritol tetra(meth)acrylate, dipentaerythritol hexa(meth)acrylate, di(meth)acrylate of ethylene oxide or propylene oxide adduct of bisphenol A, di(meth)acrylate of ethylene oxide or propylene oxide adduct of a halogenated bisphenol A, di or tri(meth)acrylate of ethylene oxide or propylene oxide adduct of isocyanurate, and the like.

Examples of the polyarylate monomer include triallyl isocyanurate and the like. Examples of the glycidyl compound monomer include glycidyl(meth)acrylate, allyl glycidyl ether, and the like. Examples of the unsaturated carboxylic acid monomer include acrylic acid, methacrylic acid, itaconic acid, maleic acid, fumaric acid, and a half-esterification product or anhydride thereof.

The acrylic thermoplastic resin according to the present embodiment may be composed of one kind of copolymer or may be a blend of two or more kinds of copolymers having one or more constituent units including a constituent unit (X), a constituent unit (Y1), and a constituent unit (Y2). For example, the acrylic thermoplastic resin may be a resin composed of one kind of copolymer having the repeating unit (X), the repeating unit (Y1) and the repeating unit (Y2). Alternatively, the acrylic thermoplastic resin may be a blend composed of two or more kinds of copolymers having the repeating unit (X), the repeating unit (Y1) and/or the repeating unit (Y2) or may be a blend composed of a polymer having the repeating unit (X), a polymer having the repeating unit (Y1) and a polymer having the repeating unit (Y2). The acrylic thermoplastic resin is preferably a copolymer having the repeating unit (X), the repeating unit (Y1) and the repeating unit (Y2), or a blend composed of two or more kinds of copolymers having the repeating unit (X), the repeating unit (Y1), and/or the repeating unit (Y2), and particularly preferably a copolymer having the repeating unit (X), the repeating unit (Y1), and the repeating unit (Y2), from the viewpoint of transparency and homogeneity.

In the case where the acrylic thermoplastic resin is composed of two or more kinds of copolymers having different copolymer compositions, the respective contents ($X_{wt}$, $Y1_{wt}$, and $Y2_{wt}$) of the constituent unit (X), the constituent unit (Y1), and the constituent unit (Y2) are each calculated as a proportion of the total amount of each constituent unit when the total amount of the constituent unit (X), the constituent unit (Y1), and the constituent unit (Y2) included in the acrylic thermoplastic resin as a whole is 100% by mass.

The sum of monomers that remain in the acrylic thermoplastic resin (that constitute the repeating unit of the copolymer) is preferably not more than 0.5% by mass, more preferably not more than 0.4% by mass, and even more preferably not more than 0.3% by mass with respect to 100% by mass of the acrylic thermoplastic resin (copolymer). The sum of residual monomers exceeding 0.5% by mass causes staining by heating during molding or degradation of heat resistance and weather resistance of the molded object, making the resultant product not practicable.

The acrylic thermoplastic resin according to the present embodiment preferably has a weight-average molecular weight (Mw) in the range of 3000 to 1000000 in terms of PMMA standards according to a GPC measurement method. With the weight-average molecular weight of not less than 3000, the strength required as a polymer can be exhibited. With not more than 1000000, the molded object by press-forming can be obtained. The weight-average molecular weight of the acrylic thermoplastic resin is more preferably 4000 to 800000, even more preferably 5000 to 500000, and further more preferably 100000 to 500000.

The acrylic thermoplastic resin according to the present embodiment has a molecular weight distribution (Mw/Mn) in the range of 1 to 10 according to a GPC measurement method. The acrylic thermoplastic resin composition can be polymerized by a living radical polymerization method, and the molecular weight distribution can be adjusted as necessary. The molecular weight distribution (Mw/Mn) is preferably 1.1 to 7.0, more preferably 1.2 to 5.0, and even more preferably 1.5 to 4.0 from the viewpoint of adjusting the resin viscosity to the one suitable for molding.

The halogen atom content in the acrylic thermoplastic resin according to the present embodiment is not less than 0 and less than 0.47% by weight with reference to the mass of the acrylic thermoplastic resin as a whole. If the acrylic thermoplastic resin contains a high halogen atom content, when the acrylic thermoplastic resin is handled at high temperatures for melt molding etc., a halogen-based gas may be produced to cause corrosion of the device or affect the operation environment. In addition, when waste from a molded object of the acrylic thermoplastic resin contains a large amount of halogen atoms, the halogen-based gas whose environment load is relatively large may be produced as a decomposition product.

[Polymerization Reaction]

In the polymerization reaction of the acrylic thermoplastic resin according to the present embodiment, it is preferable to combine monomers close in reactivity and/or monomers with high polymerization performance because the resin composition ratio of the resultant acrylic thermoplastic resin can be easily controlled based on the ratio of a raw material composition charged in a reaction solution. On the other hand, a case where monomers significantly different in reactivity are combined may cause the following problems: a) a monomer having low reactivity does not react well and remain as a unreacted monomer, and b) it is difficult to predict the resin composition ratio of the resultant acrylic thermoplastic resin.

In particular, if the unreacted monomer remains, the characteristics of the acrylic thermoplastic resin, for example, transparency and weather resistance, are degraded.

As a polymerization method of the acrylic thermoplastic resin according to the present embodiment, a polymerization method generally performed, such as cast polymerization, bulk polymerization, suspension polymerization, solution polymerization, emulsion polymerization, living radical polymerization, and anionic polymerization can be used. In the case where the acrylic thermoplastic resin is used for optical material applications, it is preferred that contamination with minute foreign substances should be avoided as much as possible. From this viewpoint, cast polymerization and solution polymerization, which do not involve using suspending or emulsifying agents, are preferably used.

Any of, for example, batch polymerization and continuous polymerization can be used as a polymerization process. A batch polymerization process is preferably used because the polymerization operation is easy. A continuous polymerization process is preferably used because the resultant polymer has higher compositional homogeneity.

The temperature and the polymerization time in the polymerization reaction vary depending on the kinds and contents of the monomers used, etc. For example, the polymerization temperature is 0 to 150° C., and the polymerization time is 0.5 to 24 hours. Preferably, the polymerization temperature is 80 to 150° C., and the polymerization time is 1 to 12 hours.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used alone or in combination of two or more of them. A solvent having a boiling point of 50 to 200° C. is preferable because too high a boiling point of the solvent used increases volatile contents remaining in the finally obtained acrylic thermoplastic resin.

In the polymerization reaction, a polymerization initiator may be added, if necessary. Any initiator generally used in radical polymerization can be used as the polymerization initiator. Examples thereof can include: organic peroxides such as cumene hydroperoxide, diisopropylbenzene hydroperoxide, di-t-butyl peroxide, lauroyl peroxide, benzoyl peroxide, t-butyl peroxyisopropylcarbonate, and t-amyl peroxy-2-ethylhexanoate; and azo compounds such as 2,2'-azobis (isobutyronitrile), 1,1'-azobis(cyclohexanecarbonitrile), 2,2'-azobis(2,4-dimethylvaleronitril e), and dimethyl-2,2'-azobisisobutylate. These polymerization initiators may be used alone or in combination of two or more of them.

The amount of the polymerization initiator used may be set appropriately according to monomer combination, reaction conditions, etc. Preferably, the polymerization initiator is used in the range of 0.005 to 5% by mass although not being particularly limited thereto.

A molecular weight regulator used, if necessary, in the polymerization reaction is any of those used in general radical polymerization. Particularly preferable examples thereof include mercaptan compounds such as butyl mercaptan, octyl mercaptan, dodecyl mercaptan, and 2-ethylhexyl thioglycolate. These molecular weight regulators are added in a concentration range that controls the degree of polymerization within the ranges described above.

An organic phosphorus-based compound or an organic acid may be added, if necessary, in the polymerization reaction. The coexistence of these compounds suppresses a side reaction and/or reduces the amount of the unreacted N-substituted maleimide, whereby staining of the resultant acrylic thermoplastic resin during molding may be reduced.

Examples of the organic phosphorus-based compound include: alkyl(aryl)phosphonous acid and diester or monoester thereof; dialkyl(aryl)phosphinic acid and ester thereof; alkyl(aryl)phosphonic acid and diester or monoester thereof; alkyl phosphinous acid and ester thereof; phosphorous acid diester, phosphorous acid monoester, and phosphorous acid triester; phosphoric acid diester, phosphoric acid monoester, and phosphoric acid triester. These organic phosphorus-based compounds may be used alone or in combination of two or more. The amount of organic phosphorus-based compound used is preferably 0.001 to 5.0% by mass with respect to the total amount of monomers.

Examples of the organic acid include acetic acid, propionic acid, butyric acid, valeric acid, capronic acid, caprylic acid, capric acid, lauric acid, stearic acid, oleic acid, linoleic acid, linolenic acid, benzoic acid, cyclohexanecarboxylic acid, phthalic acid, isophthalic acid, terephthalic acid, and acid anhydride thereof. These organic acids may be used alone or in combination of two or more. The amount of organic acid used is preferably 0.001 to 1.0% by mass with respect to the total amount of monomers.

The polymerization reaction is preferably carried out with a polymer concentration of not less than 10% by mass and not more than 95% by mass. With the polymer concentration of not less than 10% by mass, the adjustment of molecular weight and molecular weight distribution is easy. With the polymer concentration of not more than 95% by mass, a polymer of high molecular weight can be obtained. The polymer concentration is controlled to preferably not more than 75% by mass, more preferably not more than 60% by mass for an appropriate viscosity of the reaction solution from the viewpoint of heat removal during polymerization.

It is preferred to appropriately add a polymerization solvent because the viscosity of the polymerization reaction solution is kept appropriately. The appropriately kept viscosity of the polymerization reaction solution can control heat removal and suppress microgel in the reaction solution. In particular, in the latter half of the polymerization reaction in which the viscosity is increased, it is more preferred to control the polymer concentration to not more than 50% by mass by appropriately adding the polymerization solvent.

The manner in which the polymerization solvent is added appropriately to the polymerization reaction solution is not particularly limited. For example, the polymerization solvent may be added continuously or intermittently. Thus, by controlling the concentration of the acrylic thermoplastic resin produced in the polymerization reaction solution, the temperature homogeneity in the reactor can be improved, and the gelation of the reaction solution can be suppressed more sufficiently. The added polymerization solvent may be, for example, the same kind of solvent as the initially charged one used in the polymerization reaction or a different kind of solvent therefrom. The same kind of solvent as the initially charged one used in the polymerization reaction is preferably used. The added polymerization solvent may be a single solvent or a mixed solvent of two or more kinds.

When the acrylic thermoplastic resin is prepared by suspension polymerization, a suspension agent and, if necessary, a suspension aid are added in an aqueous medium for polymerization. Examples of the suspension agent include water-soluble polymers such as polyvinyl alcohol, methylcellulose, and polyacrylamide, and inorganic substances such as calcium phosphate and magnesium pyrophosphate. It is preferable to use 0.03 to 1% by mass of the soluble polymer with respect to the total amount of monomers. It is preferable to use 0.05 to 0.5% by mass of the inorganic substance with respect to the total amount of monomers. Examples of the suspension aid include anionic surfactants such as sodium dodecylbenzenesulfonate. When the inorganic substance is used as the suspension agent, a suspension aid is preferably used. It is preferable to use 0.001 to 0.02% by mass of the suspension aid with respect to 100% by mass of monomers.

[Devolatilization Step]

The devolatilization step means a step of removing volatile contents such as a polymerization solvent, residual monomers, and water, under conditions involving heating under reduced pressure, if necessary. If this removing step is insufficient, more volatile contents remain in the obtained acrylic thermoplastic resin, causing staining due to the alteration, etc., of the molded resin or molding defects such as bubbles or silver streaks. The amount of remaining volatile contents is preferably not more than 0.5% by mass, more preferably not more than 0.4% by mass, and even more preferably not more than 0.3% by mass with respect to 100% by mass of the acrylic thermoplastic resin. The amount of remaining volatile contents is equivalent to the total amount of residual monomers not reacting during the polymerization reaction, the polymerization solvent, and a side reaction product.

Examples of an apparatus used in the devolatilization step include: a devolatilization apparatus comprising a heat exchanger and a devolatilizing tank; a vented extruder; and a devolatilization apparatus arranged in series with an extruder. When the vented extruder is used, it may have one or several vents and preferably has several vents.

The temperature in the devolatilization step is preferably 150 to 350° C., more preferably 170 to 330° C., and even more preferably 200 to 300° C. A temperature lower than 150° C. might increase the remaining volatile contents. On the contrary, a temperature exceeding 350° C. might cause staining or decomposition of the resultant acrylic thermoplastic resin.

The pressure in the devolatilization step is preferably 931 to 1.33 hPa (700 to 1 mmHg), more preferably 800 to 13.3 hPa (600 to 10 mmHg), and even more preferably 667 to 20.0 hPa (500 to 15 mmHg). A pressure exceeding 931 hPa (700 mmHg) might facilitate remaining of volatile contents. On the contrary, a pressure lower than 1.33 hPa (1 mmHg) might make industrial practice difficult.

The process time is selected appropriately depending on the amount of remaining volatile contents. A shorter time is more preferable for suppressing staining or decomposition of the resultant acrylic thermoplastic resin.

When the monomer reaction conversion ratio during polymerization reaction is low, a large amount of unreacted monomers remain in the polymerization solution. In this case, treatment at a high temperature for a long time is required to reduce the remaining volatile contents of the resultant acrylic thermoplastic resin. However, this may lead to staining and decomposition. In treatment of the polymerization reaction solution including a large amount of unreacted monomers, the monomers of interest can be removed from the polymerization reaction solution, for example, by performing pretreatment of adding an aromatic hydrocarbon-based solvent, a hydrocarbon-based solvent or an alcohol-based solvent to the polymerization solution, thereafter performing a homogenizer (emulsification dispersion) treatment, and performing liquid-liquid extraction or solid-liquid extraction for the unreacted monomers. When the polymerization reaction solution after removal of the monomers through the pretreatment is subjected to the devolatilization step, the total of monomers remaining in 100% by mass of the resultant acrylic thermoplastic resin can be reduced to 0.5% by mass or less.

A smaller number of foreign substances contained in the acrylic thermoplastic resin are more preferable in optical applications. Examples of a method for reducing the number of foreign substances include a method of filtering a solution or melt of the acrylic thermoplastic resin, for example, through a leaf disc-type polymer filter having filtration accuracy of 1.5 to 15 μm in the polymerization reaction, devolatilization, and molding steps.

[Acrylic Thermoplastic Resin Composition]

The acrylic thermoplastic resin according to the present embodiment may be mixed with various additives, etc., other than the polymer that constitutes the acrylic thermoplastic resin, to form an acrylic thermoplastic resin composition. The kind of additives is not specifically limited and may be any of those generally used in the formulation of resins or rubber polymers.

Examples thereof include: inorganic fillers; pigments such as iron oxide; lubricants or mold release agents such as stearic acid, behenic acid, zinc stearate, calcium stearate, magnesium stearate, and ethylene bisstearamide; softeners or plasticizers such as paraffin-based process oil, naphthene-based process oil, aromatic process oil, paraffin, organic polysiloxane, and mineral oil; antioxidants such as hindered phenol-based antioxidants and phosphorus-based heat stabilizers; hindered amine-based light stabilizers, benzotriazole-based UV absorbers, flame retardants, antistatic agents; reinforcements such as organic fibers, glass fibers, carbon fibers, and metal whiskers; coloring agents; other additives; and mixtures thereof. The content of the additive is preferably 0 to 5% by mass, more preferably 0 to 2% by mass, and even more preferably 0 to 1% by mass.

The acrylic thermoplastic resin can contain, for example, at least one of thermoplastic resins including: polyolefin-based resins such as polyethylene and polypropylene; styrene-based resins such as polystyrene, styrene-acrylonitrile copolymers, styrene-maleic anhydride copolymers, and styrene-methacrylic acid copolymers; polymethacrylate resins; polyamide; polyphenylene sulfide resins; polyether ether ketone resins; polyester-based resins; polysulfone; polyphenylene oxide; polyimide; polyetherimide; polyacetal; cyclic olefin-based resins; norbornene-based resins; and cellulose resins such as triacetylcellulose, and thermosetting resins including: phenol resins; melamine resins; silicone resins; and epoxy resins, without impairing the objectives of the present invention.

When the characteristics of a film- or sheet-like molded object obtained by molding the acrylic thermoplastic resin according to the present embodiment or the acrylic thermoplastic resin composition are evaluated, the absolute value of a photoelastic coefficient (C) of the molded object is not greater than $3.0 \times 10^{-12}$ $Pa^{-1}$.

The absolute value of a photoelastic coefficient (C) is more preferably not greater than $2.0 \times 10^{-12}$ $Pa^{-1}$, even more preferably not greater than $1.0 \times 10^{-12}$ $Pa^{-1}$.

The photoelastic coefficient is described in various documents (see, for example, Chemical Review, No. 39, 1998 (published by Japan Scientific Societies Press)) and defined according to the following equation. It is understood that as the value of a photoelastic coefficient $C_R$ is closer to zero, a birefringence change by external forces is smaller.

$$C_R = |\Delta n|/\sigma_R$$

$$|\Delta n| = nx - ny$$

(where $C_R$ is photoelastic coefficient, $\sigma_R$ is extensional stress, $|\Delta n|$ is absolute value of birefringence, nx is refractive index in the extension direction, and ny is refractive index in the direction perpendicular to the extension direction.)

The photoelastic coefficient (C) of the acrylic thermoplastic resin of the present embodiment or the acrylic thermoplastic resin composition is sufficiently small when compared with the existing resins (for example, PMMA, PC, triacetylcellulose resins, cyclic olefin resins, etc.). Therefore, (photoelastic) birefringence caused by external forces does not occur, resulting in less birefringence change. In addition, (photoelastic) birefringence resulting from the remaining stress during molding is less likely to occur, resulting in a small birefringence distribution in the molded object.

When the characteristics of a film obtained by molding the acrylic thermoplastic resin of the present embodiment or the acrylic thermoplastic resin composition are evaluated, a value of a slope K in the equation (A) of linear relationship between birefringence ($\Delta n(S)$) developed when the film is uniaxially drawn and a draw rate (S) by least squares approximation satisfies the following expression (B).

$$\Delta n(S) = K \times S + C \text{ (C is a constant that is a birefringence value when the film is not drawn)} \quad (A)$$

$$|K| = \leq 0.30 \times 10^{-6} \quad (B)$$

(The birefringence is a value obtained by converting the value measured from the film of the acrylic thermoplastic resin or the acrylic thermoplastic resin composition into a value in terms of a 100-μm thickness.)

The absolute value of the slope K is more preferably $|K| = \leq 0.15 \times 10^{-6}$, even more preferably $|K| = \leq 0.10 \times 10^{-6}$. A smaller absolute value of the slope K is preferred because birefringence due to drawing is less likely to occur.

In this context, the K value is a value obtained by measuring a glass transition temperature (Tg) of the thermoplastic resin by DSC measurement and performing uniaxial drawing at a drawing temperature of (Tg+20)° C. and a drawing speed of 500 mm/min. In general, it is known that a slower drawing speed offers a smaller increment of birefringence. The K value can be calculated, for example, by measuring the values of birefringence ($\Delta n(S)$) exhibited by the uniaxially drawn films obtained by drawing at draw rates (S) of 100%, 200%, and 300%, and by plotting these values against the draw rates by least squares approximation. The draw rate (S) is a value represented by the following expression, where $L_0$ represents an inter-chuck distance before drawing, and $L_1$ represents an inter-chuck distance after drawing.

$$S = \frac{L_1 - L_0}{L_0} \times 100(\%) \quad \text{[Mathematical Expression 1]}$$

The film or sheet may be drawn for the purpose of increasing the mechanical strength. In the expression above, the value of the slope K represents the magnitude of change in birefringence ($\Delta n(S)$) with respect to the draw rate (S). A larger K value means a larger change of birefringence attributable to drawing, while a smaller K value means a smaller change of birefringence attributable to drawing.

In the acrylic thermoplastic resin of the present embodiment or the acrylic thermoplastic resin composition, the value of the slope K is sufficiently small when compared with the existing resins (for example, PMMA, PC, triacetylcellulose resins, cyclic olefin resins, etc.). Therefore, the birefringence is less increased even after drawing, whereas the birefringence is increased due to the drawing orientation when the existing resins are drawn.

When the characteristics of a film- or sheet-like molded object obtained by molding the acrylic thermoplastic resin of the present embodiment or the acrylic thermoplastic resin composition are evaluated, (i) the absolute value of retardation (Re) in the in-plane direction is preferably not greater than 30 nm.

(Here, the retardation is a value obtained by converting the value measured as a film into a value in terms of a 100-μm thickness.)

The absolute value of retardation (Re) in the in-plane direction is more preferably not greater than 20 nm, even more preferably not greater than 15 nm, particularly preferably not greater than 11 nm. In general, the absolute value of retardation is an index representing the magnitude of birefringence.

The birefringence of the acrylic thermoplastic resin of the present embodiment or the acrylic thermoplastic resin composition is sufficiently small when compared with that of the existing resins (for example, PMMA, PC, triacetylcellulose resins, cyclic olefin resins, etc.) and therefore suitable as optical materials for the applications that require low birefringence or zero birefringence.

On the other hand, the absolute value of retardation exceeding 30 nm in the in-plane direction means high refractive index anisotropy, which cannot be employed as optical materials in the applications that require low birefringence or zero birefringence. In the case where the optical materials (for example, films or sheets) are drawn for improving the mechanical strength, if the absolute value of retardation in the in-plane direction after drawing exceeds 30 nm, the resultant optical materials are not low-birefringence or zero-birefringence materials.

When the characteristics of the acrylic thermoplastic resin of the present embodiment or the acrylic thermoplastic resin composition are evaluated in the form of a film- or sheet-like molded object, (ii) the absolute value of retardation (Rth) in the thickness direction is preferably not greater than 30 nm.

(Here, the retardation is a value obtained by converting the value measured from a film of the acrylic thermoplastic resin or the acrylic thermoplastic resin composition into a value in terms of a 100-μm thickness.)

The absolute value of retardation (Rth) in the thickness direction is more preferably not greater than 20 nm, even more preferably not greater than 15 nm, particularly preferably not greater than 11 nm.

This retardation in the thickness direction serves as an index that correlates with the viewing angle characteristic of a display incorporating the optical material, especially, the optical film therein. Specifically, a smaller absolute value of retardation in the thickness direction denotes more favorable viewing angle characteristic, leading to a smaller display color tone change and contrast reduction depending on the angle at which the display is viewed.

The acrylic thermoplastic resin of the present embodiment or the acrylic thermoplastic resin composition is characterized in that an optical film thereof has an extremely small absolute value of retardation in the thickness direction when compared with the existing resins (for example, PMMA, PC, triacetylcellulose resins, cyclic olefin resins, etc.).

The acrylic thermoplastic resin of the present embodiment or the acrylic thermoplastic resin composition preferably has (iii) a glass transition temperature (Tg) of not lower than 120° C.

If the glass transition temperature (Tg) of the acrylic thermoplastic resin of the present embodiment is not lower than 120° C., necessary and sufficient heat resistance can be easily obtained for the recent lens molded objects and film molded objects for liquid crystal displays. The temperature is preferably not lower than 130° C., more preferably not lower than 135° C. On the other hand, the upper limit of Tg is preferably 180° C. or higher.

The acrylic thermoplastic resin preferably has high heat resistance from the viewpoint of dimensional stability at the use environmental temperatures. Thus, the glass transition temperature of the acrylic thermoplastic resin or the acrylic thermoplastic resin composition is more preferably not lower than 130° C., even more preferably not lower than 135° C.

The acrylic thermoplastic resin of the present embodiment or the acrylic thermoplastic resin composition preferably has (iv) total light transmittance of 85% or higher.

(Here, the total light transmittance is a value in the thickness direction that is measured from a 100 μm-thick film of the acrylic thermoplastic resin or the acrylic thermoplastic resin composition).

The total light transmittance of the film is more preferably 88% or higher, even more preferably 90% or higher. The total light transmittance of lower than 85% leads to reduction in transparency and may not be employed in the applications that require high transparency.

The acrylic thermoplastic resin of the present embodiment or the acrylic thermoplastic resin composition has a sufficiently small photoelastic coefficient (C) (approximately zero), and when molded in an optical film, has a small absolute value (approximately zero) of retardation in the in-plane direction and the thickness direction, irrespective of whether it is drawn or not, thereby achieving optically perfect isotropy which cannot be achieved with the conventionally known resins. High heat resistance is also achieved at the same time.

The optical film formed by molding the acrylic thermoplastic resin of the present embodiment or the acrylic thermoplastic resin composition is suitable mainly in applications that do not require birefringence, for example, for polarizing plate protective films.

[Molded Object]

The acrylic thermoplastic resin or the acrylic thermoplastic resin composition can form, for example, extrusion-molded objects such as sheets, films, strands, and pipes, disk-like, cube-like, and plate-like injection-molded objects, and press-formed products.

Such molded objects have characteristics corresponding to those of the acrylic thermoplastic resin of the present embodiment or the acrylic thermoplastic resin composition as described above.

In the present description, the thickness of the "sheet" or "film" is preferably 1 to 10000 μm, more preferably 1 to 5000 μm, even more preferably 1 to 3000 μm.

Examples of methods of obtaining a molded object of the acrylic thermoplastic resin or the acrylic thermoplastic resin composition include extrusion molding, solution cast molding, and the like in the case of sheets or films.

Specifically, in extrusion molding, an extruder equipped with a T-die or round die may be used to mold the molten resin into a sheet or film. In this case, a molded object can be obtained by melt-kneading the various additives and thermoplastic resins other than the acrylic thermoplastic resin of the present invention, with the acrylic thermoplastic resin. In solution cast molding, the resin is dissolved in a solvent such as chloroform or methylene dichloride to produce a polymer solution, which is subjected to cast-drying/solidification to form a sheet or film.

The drawing of the sheet or film can be performed continuously from the extrusion molding or cast molding. For example, the undrawn film or sheet can be drawn longitudinally and uniaxially in the machine direction or transversely and uniaxially in the direction orthogonal to the machine direction, or can be drawn by a successive biaxial drawing method using roll drawing and tenter drawing, a simultaneous biaxial drawing method using tenter drawing, a biaxial drawing method using tubular drawing, etc., to produce a biaxially drawn film.

The drawing can improve the strength of the molded object. The draw rate is not smaller than 0.1% and not greater than 300% in at least one direction. It is preferably not smaller than 0.2% and not greater than 290%, more preferably not smaller than 0.3% and not greater than 280%. The drawing in this range results in a molded object excellent in strength, transparency, and birefringence or any other optical properties.

The molded object after drawing can be subjected to heat treatment (annealing) for the purpose of stabilizing its mechanical strength or optical properties. The conditions of the heat treatment can be appropriately selected similar to the conditions of heat treatment for the conventionally known sheets or film, and are not specifically limited.

The molded object according to the present embodiment, for example, the sheet or film, can also be subjected to, for example, surface functionalization treatment such as antireflection, transparent conductive, electromagnetic shielding, or gas barrier treatment.

The injection-molded object can be obtained by using a conventionally known method in the following ranges: injection molding temperatures of 200 to 260° C., die temperatures of 50 to 100° C., injection pressures of 5 to 20 MPa, and holding pressures of 1 to 10 MPa.

The acrylic thermoplastic resin of the present embodiment or the acrylic thermoplastic resin composition can be suitably used as optical materials, for example, for molded objects such as optical films (polarizing plate protective films and retarder films), display substrates, lenses, pickup lenses, and transparent plastic substrates for use in touch panels or solar cells. Another applications include waveguides, lenses, lens arrays, optical fibers, coating materials of optical fibers, LED lenses, lens covers, and the like in the fields of optical communication, optical switching, and optical measurement systems.

EXAMPLES

Hereinafter, the present invention will be described more specifically with reference to Examples. However, the present invention is not limited the following Examples.

The measurement methods for measurement values are as follows.

(a) Analysis of Acrylic Thermoplastic Resin (1) Repeating Units (i) A repeating unit (X) derived from a methacrylate monomer, (ii) a repeating unit (Y1) derived from an N-substituted maleimide monomer (a), (iii) a repeating unit (Y2) derived from an N-substituted maleimide monomer (b), and (iv) a repeating unit derived from an aromatic vinyl monomer were identified by $^1$H-NMR measurement and $^{13}$C-NMR measurement, and their abundance was calculated.

Measuring instrument: DPX-400 manufactured by BRUKER Corp.

Measurement solvent: $CDCl_3$ or $d^6$-DMSO

Measurement temperature: 40° C.

(2) Glass Transition Temperature

A glass transition temperature (Tg) was measured according to JIS-K-7121 with α-alumina as a reference in a nitrogen gas atmosphere using a differential scanning calorimeter (Diamond DSC manufactured by Perkin Elmer Japan Co., Ltd.) and calculated by a midpoint method from the resultant DSC curve. The DSC curve was obtained by holding approximately 10 mg of a sample at 40° C. for five minutes, then increasing the temperature to 200° C. at 20° C./min, followed by cooling down to 40° C., holding at 40° C. for one minute, and thereafter increasing the temperature to 200° C. at a rate of 10° C./min.

(3) Molecular Weight

Weight-average and number-average molecular weights were measured using a gel permeation chromatograph (HLC-8220 manufactured by TOSOH Corp.) and determined in terms of commercially available PMMA standards at a temperature set to 40° C. with tetrahydrofuran as a solvent.

(4) Measurement of Remaining Volatile Contents

A gas chromatograph (GC-14B manufactured by Shimadzu Corporation) was used for measurement.

(5) Weather Resistance

The weather resistance was evaluated by measuring a yellow index using a spectrophotometer (SD-5000 manufactured by Nippon Denshoku Industries Co., Ltd.) after exposure in an environment at a temperature of 63° C. and a humidity of 60% for 150 hours using Eye Super UV Tester (SUV-W151 manufactured by Iwasaki Electric Co., Ltd; metal hydride lamp).

(6) Water Absorbency

Measurement was carried out in accordance with ASTM D570.

(7) Refractive Index

The refractive index was measured using a measuring instrument PRISM COUPLER (MODEL 2010 manufactured by Metricon Corporation) at a measurement wavelength of 633 nm.

(8) Halogen Atom Content

The halogen atom content was measured through a burning process and a subsequent ion chromatograph process. Specifically, the sample was burnt in an oxygen flow using a quartz combustion tube, and the produced gas was allowed to be absorbed in an absorber liquid (3% hydrogen peroxide solution). The resultant absorber liquid was appropriately diluted. The amount of halogen ions in the absorber liquid was determined with an ion chromatograph ("ICS-2000" manufactured by Daionex Corporation). The halogen atom content was determined from the measurement value.

(b) Evaluation of Optical Properties (1) Preparation of Optical Film Sample (1-a) Formation of Press Film A press film was formed through preheating at 260° C. for 25 minutes under atmospheric pressure, followed by compression at 260° C. and approximately 10 MPa for five minutes under vacuum (approximately 10 kPa), using a vacuum compression molding machine (SFV-30 model manufactured by SHINTO Metal Industries Corporation).

(1-b) Formation of Drawn Film

A drawn film was formed through uniaxial free-width drawing at a drawing temperature of (Tg+20)° C. and a drawing speed of 500 mm/min using a 5 t tensile tester manufactured by Instron Corp. The draw rate was set to 100%, 200%, and 300%.

(2) Measurement of Birefringence

Measurement was performed by a rotating analyzer method using RETS-100 manufactured by OTSUKA ELECTRONICS CO., LTD. The birefringence value is a value of light having a wavelength of 550 nm Birefringence (Δn) was calculated according to the equation below. The obtained was converted into a value in terms of a film thickness of 100 μm as a measurement value.

$$\Delta n = nx - ny$$

(Δn: birefringence, nx: refractive index in the extension direction, and ny: refractive index in the direction perpendicular to the extension direction)

The absolute value (|Δn|) of birefringence (Δn) was determined as follows.

$$|\Delta n| = |nx - ny|$$

(3) Measurement of Retardation

<In-Plane Retardation>

Measurement was performed in a range of wavelengths from 400 to 800 nm by a rotating analyzer method using RETS-100 manufactured by OTSUKA ELECTRONICS CO., LTD. The obtained value was converted into a value in terms of a film thickness of 100 μm as a measurement value.

The absolute value (|Δn|) of birefringence and the retardation (Re) are in the following relationship.

$$Re = |\Delta n| \times d$$

(|Δn|: absolute value of birefringence, Re: retardation, and d: sample thickness)

The absolute value (|Δn|) of birefringence is a value represented by the following equation.

$$|\Delta n| = |nx - ny|$$

(nx: refractive index in the extension direction and ny: in-plane refractive index in the direction perpendicular to the extension direction)

<Retardation in Thickness Direction>

Retardation was measured at a wavelength of 589 nm using a retardation measuring apparatus (KOBRA-21ADH) manufactured by Oji Scientific Instruments. The obtained value was converted into a value in terms of a film thickness of 100 μm as a measurement value.

The absolute value (|Δn|) of birefringence and the retardation (Rth) are in the following relationship.

$$Rth = |\Delta n| \times d$$

(|Δn|: absolute value of birefringence, Rth: retardation, and d: sample thickness)

The absolute value (|Δn|) of birefringence is a value represented by the following equation.

$$|\Delta n| = |(nx+ny)/2 - nz|$$

(nx: refractive index in the extension direction, ny: in-plane refractive index in the direction perpendicular to the extension direction, and nz: out-of-plane refractive index in the thickness direction perpendicular to the extension direction)

(In an ideal film having perfect optical isotropy in all the three-dimensional directions, both the in-plane retardation (Re) and the retardation (Rth) in the thickness direction are zero.)

(4) Measurement of Photoelastic Coefficient

A birefringence measuring apparatus described in detail in Polymer Engineering and Science 1999, 39, 2349-2357 was used. Specifically, a film stretching apparatus (Imoto Machinery Co., Ltd.) was placed on a laser light path, and birefringence was measured in a range of wavelengths from 400 to 800 nm at 23° C. under extensional stress by a rotating analyzer method using RETS-100 manufactured by OTSUKA ELECTRONICS CO., LTD. A test piece of 6 mm in width was measured at a strain rate of 50%/min (inter-chuck: 50 mm, chuck moving speed: 5 mm/min) during extension. From the relationship of the absolute value (|Δn|) of birefringence and the extensional stress ($\sigma_R$), a photoelastic coefficient ($C_R$) was calculated by determining a slope of the line by least squares approximation. Data obtained with extensional stress of 2.5 MPa $\leq \sigma_R \leq$ 10 MPa was used in the calculation.

$$C_R = |\Delta n| / \sigma_R$$

$$|\Delta n| = |nx - ny|$$

($C_R$: photoelastic coefficient, $\sigma_R$: extensional stress, $|\Delta n|$: absolute value of birefringence, nx: refractive index in the extension direction, and ny: refractive index in the direction perpendicular to the extension direction)

(5) Evaluation of Durability Against Humidity and Heat

The 100% drawn film formed by the method described in (1-b) above was left in a constant temperature and humidity bath at an atmosphere temperature of 80° C. and humidity of 90% RH for 1000 hours. The optical property change before and after the test was evaluated using the in-plane retardation (Re).

[Acrylic Thermoplastic Resin]
Methyl Methacrylate/N-phenylmaleimide/N-cyclohexylmaleimide Polymer

Example 1

An SUS reactor (capacity: 0.5 L) equipped with a stirrer, a humidity sensor, a cooling tube, a nitrogen gas inlet nozzle, a raw material solution inlet nozzle, an initiator solution inlet nozzle, and a polymerization solution outlet nozzle was used. The pressure of the polymerization reactor was controlled to slight pressure, while the reaction temperature was controlled with oil bath to 130° C.

A raw material solution was prepared by mixing 576 g of methyl methacrylate (MMA), 61 g of N-phenylmaleimide (N-PheMI), 83 g of N-cyclohexylmaleimide (N-CyMI), and 480 g of methyl isobutyl ketone, followed by replacement by nitrogen gas. An initiator solution was prepared by dissolving 8.63 g of PERHEXA C (manufactured by NOF CORPORATION; concentration 75 wt %) in 91.37 g of methyl isobutyl ketone, followed by replacement by nitrogen gas.

The raw material solution was introduced at 8.25 ml/min from the raw material solution inlet nozzle using a pump. The initiator solution was introduced at 0.08 ml/min from the initiator solution inlet nozzle using a pump. After 30 minutes, a polymer solution was discharged at a constant flow rate of 500 ml/hr from the polymerization solution outlet nozzle using an extraction pump.

The polymer solution obtained for the first 1.5 hours after the discharge was separately collected into an initial flow tank. The polymer solution for 1.5 to 2.5 hours after the initiation of discharge was mainly collected. The obtained polymer solution and methanol serving as an extraction solvent were supplied simultaneously to a homogenizer for emulsion dispersion and extraction. The separated and precipitated polymer was collected and dried in a vacuum at 130° C. for two hours to obtain the acrylic thermoplastic resin of interest.

Composition: MMA/N-PheMI/N-CyMI=81/8/11 wt %
Molecular weight: Mw=22.5×10$^4$; Mw/Mn=2.09
Tg: 135° C.

The $^1$H-NMR spectrum of the product is shown in FIG. 1.

Example 2

An acrylic thermoplastic resin was obtained by the same procedure as in Example 1 except that MMA: 576 g, N-PheMI: 50 g, N-CyMI: 94 g were used in Example 1.
Composition: MMA/N-PheMI/N-CyMI=79/6/15 wt %
Molecular weight: Mw=15.4×10$^4$; Mw/Mn=1.75
Tg: 135° C.

Example 3

An acrylic thermoplastic resin was obtained by the same procedure as in Example 1 except that MMA: 576 g, N-PheMI: 83 g, N-CyMI: 61 g were used in Example 1.
Composition: MMA/N-PheMI/N-CyMI=77/10/12 wt %
Molecular weight: Mw=14.3×10$^4$; Mw/Mn=1.79
Tg: 137° C.

Example 4

An acrylic thermoplastic resin was obtained by the same procedure as in Example 1 except that MMA: 504 g, N-PheMI: 2.4 g, N-CyMI: 213.6 g were used in Example 1.
Composition: MMA/N-PheMI/N-CyMI=70/1/29 wt %
Molecular weight: Mw=18.7×10$^4$; Mw/Mn=1.81
Tg: 146° C.

Example 5

An acrylic thermoplastic resin was obtained by the same procedure as in Example 1 except that MMA: 504 g, N-PheMI: 108 g, N-CyMI: 108 g were used in Example 1.
Composition: MMA/N-PheMI/N-CyMI=70/13/17 wt %
Molecular weight: Mw=19.3×10$^4$; Mw/Mn=1.97
Tg: 148° C.

Example 6

An acrylic thermoplastic resin was obtained by the same procedure as in Example 1 except that MMA: 576 g, N-PheMI: 129.6 g, N-CyMI: 14.4 g were used in Example 1.
Composition: MMA/N-PheMI/N-CyMI=80/16/4 wt %
Molecular weight: Mw=21.6×10$^4$; Mw/Mn=2.03
Tg: 140° C.

Example 7

An acrylic thermoplastic resin was obtained by the same procedure as in Example 1 except that MMA: 648 g, N-PheMI: 4.8 g, N-CyMI: 67.2 g were used in Example 1.
Composition: MMA/N-PheMI/N-CyMI=90/2/8 wt %
Molecular weight: Mw=23.0×10$^4$; Mw/Mn=2.07
Tg: 130° C.

Example 8

An acrylic thermoplastic resin was obtained by the same procedure as in Example 1 except that MMA: 648 g, N-PheMI: 67.2 g, N-CyMI: 4.8 g were used in Example 1.
Composition: MMA/N-PheMI/N-CyMI=90/8/2 wt %
Molecular weight: Mw=19.7×10$^4$; Mw/Mn=1.88
Tg: 130° C.

Example 9

A glass reactor (capacity: 1.0 L) equipped with a stirrer, a temperature sensor, a cooling tube, a nitrogen gas inlet nozzle, a raw material solution inlet nozzle, and an initiator solution inlet nozzle was used. The pressure of the polymerization reactor was controlled to slight pressure, while the reaction temperature was controlled with oil bath to 100° C.

A raw material solution was prepared by mixing 192 g of methyl methacrylate (MMA), 34 g of N-phenylmaleimide (N-PheMI), 46 g of N-cyclohexylmaleimide (N-CyMI), and 160 g of methyl isobutyl ketone, followed by replacement by nitrogen gas. An initiator solution was prepared by dissolving 0.6 g of PERHEXYNE 25B (manufactured by NOF CORPORATION; concentration 98 wt %) in 3.0 g of methyl isobutyl ketone, followed by replacement by nitrogen gas.

The raw material solution was introduced into the glass reactor from the raw material solution inlet nozzle by pumping. The initiator solution was introduced from the initiator solution inlet nozzle using a syringe to start polymerization reaction. Three hours after the start of the reaction was set as the reaction end point, and a polymer solution was collected. The obtained polymer solution and methanol serving as a poor solvent were supplied simultaneously to a homogenizer for emulsion dispersion and extraction. The separated and precipitated polymer was collected and dried in a vacuum at 130° C. for two hours to obtain the acrylic thermoplastic resin of interest.

Composition: MMA/N-PheMI/N-CyMI=50/17/33 wt %
Molecular weight: Mw=17.7×10$^4$; Mw/Mn=2.46
Tg: 135° C.

Example 10

An acrylic thermoplastic resin was obtained by the same procedure as in Example 1 except that MMA: 648 g, N-PheMI: 67.2 g, N-CyMI: 2.4 g were used in Example 9.

Composition: MMA/N-PheMI/N-CyMI=90/9/1 wt %
Molecular weight: Mw=26.0×10$^4$; Mw/Mn=2.50
Tg: 130° C.

Example 11

An acrylic thermoplastic resin was obtained by the same procedure as in Example 1 except that MMA: 612 g, N-PheMI: 105.6 g, N-CyMI: 2.4 g were used in Example 9.

Composition: MMA/N-PheMI/N-CyMI=85/14/1 wt %
Molecular weight: Mw=27.2×10$^4$; Mw/Mn=2.20
Tg: 135° C.
Methyl Methacrylate/N-phenylmaleimide/N-cyclohexylmaleimide/Styrene Polymer Example 12

A glass reactor (capacity: 1.0 L) equipped with a stirrer, a temperature sensor, a cooling tube, a nitrogen gas inlet nozzle, a raw material solution inlet nozzle, and an initiator solution inlet nozzle was used. The pressure of the polymerization reactor was controlled to slight pressure, while the reaction temperature was controlled with oil bath to 100° C.

A raw material solution was prepared by mixing 140 g of methyl methacrylate (MMA), 14 g of N-phenylmaleimide (N-PheMI), 34 g of N-cyclohexylmaleimide (N-CyMI), 12 g of styrene (St), and 200 g of methyl isobutyl ketone, followed by replacement by nitrogen gas. An initiator solution was prepared by dissolving 0.32 g of PERHEXA C (manufactured by NOF CORPORATION; concentration 75 wt %) in 1.00 g of methyl isobutyl ketone, followed by replacement by nitrogen gas.

The raw material solution was introduced into the glass reactor from the raw material solution inlet nozzle by pumping. The initiator solution was introduced from the initiator solution inlet nozzle using a syringe to start polymerization reaction. Three hours after the start of the reaction was set as the reaction end point, and a polymer solution was collected. The obtained polymer solution and methanol serving as a poor solvent were supplied simultaneously to a homogenizer for emulsion dispersion and extraction. The separated and precipitated polymer was collected and dried in a vacuum at 130° C. for two hours to obtain the acrylic thermoplastic resin of interest.

Composition: MMA/N-PheMI/N-CyMI/St=70/5/20/5 wt %
Molecular weight: Mw=15.6×10$^4$; Mw/Mn=2.01
Tg: 141° C.
Methyl Methacrylate/N-benzylmaleimide/N-cyclohexylmaleimide Copolymer Example 13

In a glass vessel of 100 ml, 15.6 g of methyl methacrylate, 1.4 g of N-benzylmaleimide (N-BzMI), and 3.0 g of N-cyclohexylmaleimide were precisely weighed, and then stirred and dissolved. Then, replacement by nitrogen gas was performed for five minutes. Thereafter, 0.012 g of lauroyl peroxide as an initiator and 0.02 g of n-octyl mercaptan as a chain transfer agent were added to allow a reaction to proceed in oil bath at 68° C. for 20 hours. Then, the oil bath temperature was increased to 120° C. for reaction for seven hours. After cooling, polymer bulk of an acrylic thermoplastic resin was collected from the glass vessel.

Composition: MMA/N-BzMI/N-CyMI=78/7/15 wt %
Molecular weight: Mw=23.6×10$^4$; Mw/Mn=3.12
Tg: 126° C.
Methyl Methacrylate/N-phenylmaleimide/N-ethylmaleimide Copolymer Example 14

In a glass vessel of 100 ml, 16.0 g of methyl methacrylate, 1.8 g of N-phenylmaleimide, and 2.2 g of N-ethylmaleimide (N-EtMI) were precisely weighed, and then stirred and dissolved. Then, replacement by nitrogen gas was performed for five minutes. Thereafter, 0.012 g of lauroyl peroxide as an initiator and 0.02 g of n-octyl mercaptan as a chain transfer agent were added to allow a reaction to proceed in oil bath at 68° C. for 20 hours. Then, the oil bath temperature was increased to 120° C. for reaction for seven hours. After cooling, polymer bulk of an acrylic thermoplastic resin was collected from the glass vessel.

Composition: MMA/N-PheMI/N-EtMI=80/9/11 wt %
Molecular weight: Mw=24.3×10$^4$; Mw/Mn=2.98
Tg: 128° C.
Methyl Methacrylate/N-phenylmaleimide/N-isopropylmaleimide Copolymer Example 15

In a glass vessel of 100 ml, 15.8 g of methyl methacrylate, 1.8 g of N-phenylmaleimide, and 2.4 g of N-isopropylmaleimide (N-iPrMI) were precisely weighed, and then stirred and dissolved. Then, replacement by nitrogen gas was performed for five minutes. Thereafter, 0.012 g of lauroyl peroxide as an initiator and 0.02 g of n-octyl mercaptan as a chain transfer agent were added to allow a reaction to proceed in oil bath at 68° C. for 20 hours. Then, the oil bath temperature was increased to 120° C. for reaction for seven hours. After cooling, polymer bulk of an acrylic thermoplastic resin was collected from the glass vessel.

Composition: MMA/N-PheMI/N-iPrMI=79/9/12 wt %
Molecular weight: Mw=25.6×10$^4$; Mw/Mn=3.02
Tg: 131° C.
Methyl Methacrylate/Cyclohexyl Methacrylate/N-phenylmaleimide/N-cyclohexylmaleimide Copolymer Example 16

In a glass vessel of 100 ml, 14.0 g of methyl methacrylate, 2.0 g of cyclohexyl methacrylate (CHMA), 1.8 g of N-phenylmaleimide, and 2.2 g of N-cyclohexylmaleimide were precisely weighed, and then stirred and dissolved. Then, replacement by nitrogen gas was performed for five minutes. Thereafter, 0.012 g of lauroyl peroxide as an initiator and 0.02 g of n-octyl mercaptan as a chain transfer agent were added to allow a reaction to proceed in oil bath at 68° C. for 20 hours. Then, the oil bath temperature was increased to 120° C. for reaction for seven hours. After cooling, polymer bulk of an acrylic thermoplastic resin was collected from the glass vessel.
Composition: MMA/CHMA/N-PheMI/N-CyMI=70/10/9/11 wt %
Molecular weight: Mw=25.6×10$^4$; Mw/Mn=3.03
Tg: 129° C.
Methyl Methacrylate/N-phenylmaleimide Polymer Comparative Example 1

A glass reactor (capacity: 1.0 L) equipped with a stirrer, a temperature sensor, a cooling tube, a nitrogen gas inlet nozzle, a raw material solution inlet nozzle, and an initiator solution inlet nozzle was used. The pressure of the polymerization reactor was controlled to slight pressure, while the reaction temperature was controlled with oil bath to 100° C.

A raw material solution was prepared by mixing 100 g of methyl methacrylate (MMA), 100 g of N-phenylmaleimide (N-PheMI), and 200 g of methyl isobutyl ketone, followed by replacement by nitrogen gas. An initiator solution was prepared by dissolving 0.32 g of PERHEXA C (manufactured by NOF CORPORATION; concentration 75 wt %) in 1.00 g of methyl isobutyl ketone, followed by replacement by nitrogen gas.

The raw material solution was introduced into the glass reactor from the raw material solution inlet nozzle by pumping. The initiator solution was introduced from the initiator solution inlet nozzle using a syringe to start polymerization reaction. Three hours after the start of the reaction was set as the reaction end point, and a polymer solution was collected. The obtained polymer solution and methanol serving as a poor solvent were supplied simultaneously to a homogenizer for emulsion dispersion and extraction. The separated and precipitated polymer was collected and dried in a vacuum at 130° C. for two hours to obtain the acrylic thermoplastic resin of interest.
Composition: MMA/N-PheMI=50/50 wt %
Molecular weight: Mw=15.4×10$^4$; Mw/Mn=2.19
Tg: 176° C.

Comparative Example 2

An acrylic thermoplastic resin was obtained by the same procedure as in Comparative Example 1 except that MMA: 180 g and N-PheMI: 20 g were used in Comparative Example 1.
Composition: MMA/N-PheMI=91/9 wt %
Molecular weight: Mw=21.3×10$^4$; Mw/Mn=1.71
Tg: 132° C.

Comparative Example 3

An acrylic thermoplastic resin was obtained by the same procedure as in Comparative Example 1 except that MMA: 160 g and N-PheMI: 40 g were used in Comparative Example 1.
Composition: MMA/N-PheMI=81/19 wt %
Molecular weight: Mw=19.4×10$^4$; Mw/Mn=1.81
Tg: 141° C.
Methyl Methacrylate/N-cyclohexylmaleimide Polymer Comparative Example 4

An acrylic thermoplastic resin was obtained by the same procedure as in Comparative Example 1 except that 100 g of methyl methacrylate and 100 g of N-cyclohexylmaleimide (N-CyMI) in place of N-phenylmaleimide (N-PheMI) were used in Comparative Example 1.
Composition: MMA/N-CyMI=52/48 wt %
Molecular weight: Mw=19.1×10$^4$; Mw/Mn=2.06
Tg: 163° C.

Comparative Example 5

An acrylic thermoplastic resin was obtained by the same procedure as in Comparative Example 4 except that MMA: 180 g and N-CyMI: 20 g were used in Comparative Example 4.
Composition: MMA/N-CyMI=91/9 wt %
Molecular weight: Mw=21.0×10$^4$; Mw/Mn=1.75
Tg: 129° C.

Comparative Example 6

An acrylic thermoplastic resin was obtained by the same procedure as in Comparative Example 4 except that MMA: 160 g and N-CyMI: 40 g were used in Comparative Example 4.
Composition: MMA/N-CyMI=78/22 wt %
Molecular weight: Mw=21.1×10$^4$; Mw/Mn=1.73
Tg: 135° C.
Methyl Methacrylate Polymer Comparative Example 7

An acrylic thermoplastic resin was obtained by the same procedure as in Example 1 except that only 960 g of methyl methacrylate and 240 g of methyl isobutyl ketone were used in Example 1.
Composition: MMA=100 wt %
Molecular weight: Mw=10×10$^4$; Mw/Mn=1.89
Tg: 121° C.
Methyl Methacrylate/Styrene/Maleic Anhydride/Benzyl Methacrylate Polymer Reference Example 1

A jacketed glass reactor (capacity: 1.0 L) equipped with a stirrer, a temperature sensor, a cooling tube, a nitrogen gas inlet nozzle, a raw material solution inlet nozzle, an initiator solution inlet nozzle, and a polymerization solution outlet nozzle was used. The pressure of the polymerization reactor was controlled to slight pressure, while the reaction temperature was controlled to 100° C.

A raw material solution was prepared by mixing 518 g of methyl methacrylate (MMA), 48 g of styrene (St), 9.6 g of benzyl methacrylate (BzMA), 384 g of maleic anhydride (MAH), 240 g of methyl isobutyl ketone, and 1.2 g of n-octyl mercaptan, followed by replacement by nitrogen gas. An initiator solution was prepared by dissolving 0.364 g of 2,2'-azobis(isobutyronitrile) in 12.96 g of methyl isobutyl ketone, followed by replacement by nitrogen gas.

The raw material solution was introduced at 6.98 ml/min from the raw material solution inlet nozzle using a pump. The initiator solution was introduced at 0.08 ml/min from the initiator solution inlet nozzle using a pump. After 30 minutes, a polymer solution was discharged at a constant flow rate of 425 ml/hr from the polymerization solution outlet nozzle using an extraction pump.

The polymer solution obtained for the first 1.5 hours after the discharge was separately collected into an initial flow tank. The polymer solution for 1.5 to 2.5 hours after the initiation of discharge was mainly collected. The obtained polymer solution and methanol serving as a poor solvent were supplied simultaneously to a homogenizer for emulsion dispersion and extraction. The separated and precipitated polymer was collected and dried in a vacuum at 130° C. for two hours to obtain the acrylic thermoplastic resin of interest.

Composition: MMA/St/BzMA/MAH=60/12/1/27 wt %
Molecular weight: Mw=18.8×10$^4$; Mw/Mn=2.08
Tg: 142° C.

Methyl Methacrylate/N-o-chlorophenylmaleimide/N-cyclohexylmaleimide Copolymer

Reference Example 2

In a glass vessel of 100 ml, 15.4 g of methyl methacrylate, 0.6 g of N-o-chlorophenylmaleimide (N-ClPheMI), and 4.0 g of N-cyclohexylmaleimide were precisely weighed, and then stirred and dissolved. Then, replacement by nitrogen gas was performed for five minutes. Thereafter, 0.012 g of lauroyl peroxide as an initiator and 0.02 g of n-octyl mercaptan as a chain transfer agent were added to allow a reaction to proceed in oil bath at 68° C. for 20 hours. Then, the oil bath temperature was increased to 120° C. for reaction for seven hours. After cooling, polymer bulk of an acrylic thermoplastic resin was collected from the glass vessel.

Composition: MMA/N-ClPheMI/N-CyMI=77/3/20 wt %
Molecular weight: Mw=25.6×10$^4$; Mw/Mn=3.02
Tg: 126° C.
Halogen atom content: 0.48 wt %

The compositions and evaluation results of the obtained acrylic thermoplastic resins are shown in Table 1.

TABLE 1

| | Acrylic Thermoplastic Resins | | | | | | | | |
|---|---|---|---|---|---|---|---|---|---|
| | Composition (wt %) | | | | PheMI/CyMI (molar ratio) | Tg (° C.) | GPC | | Remaining volatile content (wt %) | Weather resistance, low hygroscopicity |
| No. | MMA | PheMI | CyMI | St | | | Mw ×10$^4$ | Mw/Mn | | |
| Example 1 | 81 | 8 | 11 | — | 0.75 | 135 | 22.5 | 2.09 | <0.5 | A |
| Example 2 | 79 | 6 | 15 | — | 0.41 | 135 | 15.4 | 1.75 | <0.5 | A |
| Example 3 | 77 | 10 | 12 | — | 0.86 | 137 | 14.3 | 1.79 | <0.5 | A |
| Example 4 | 70 | 1 | 29 | — | 0.04 | 146 | 18.7 | 1.81 | <0.5 | A |
| Example 5 | 70 | 13 | 17 | — | 0.79 | 148 | 19.3 | 1.97 | <0.5 | A |
| Example 6 | 80 | 16 | 4 | — | 4.14 | 140 | 21.6 | 2.03 | <0.5 | A |
| Example 7 | 90 | 2 | 8 | — | 0.26 | 130 | 23.0 | 2.07 | <0.5 | A |
| Example 8 | 90 | 8 | 2 | — | 4.14 | 130 | 19.7 | 1.88 | <0.5 | A |
| Example 9 | 79 | 6 | 15 | | 0.41 | 135 | 17.7 | 2.46 | <0.5 | A |
| Example 10 | 90 | 9 | 1 | — | 9.31 | 130 | 26.0 | 2.50 | <0.5 | A |
| Example 11 | 85 | 14 | 1 | — | 14.49 | 135 | 27.2 | 2.20 | <0.5 | A |
| Example 12 | 70 | 5 | 20 | 5 | 0.26 | 141 | 15.6 | 2.01 | <0.5 | A |
| Example 13 | 78 | BzMI (7) | 15 | — | 0.45 | 126 | 23.6 | 3.12 | <0.5 | A |
| Example 14 | 80 | 9 | EtMI (11) | — | 0.59 | 128 | 24.3 | 2.98 | <0.5 | A |
| Example 15 | 79 | 9 | iPrMI (12) | — | 0.60 | 131 | 25.6 | 3.02 | <0.5 | A |
| Example 16 | 70 CHMA (10) | 9 | 11 | — | 0.85 | 129 | 23.9 | 3.03 | <0.5 | A |
| Comp. Example 1 | 50 | 50 | — | — | — | 176 | 15.4 | 2.19 | — | B |
| Comp. Example 2 | 91 | 9 | — | — | — | 132 | 21.3 | 1.71 | — | B |
| Comp. Example 3 | 81 | 19 | — | — | — | 141 | 19.4 | 1.81 | — | B |
| Comp. Example 4 | 52 | — | 48 | — | — | 163 | 19.1 | 2.06 | — | B |
| Comp. Example 5 | 91 | — | 9 | — | — | 129 | 21.0 | 1.75 | — | B |
| Comp. Example 6 | 78 | — | 22 | — | — | 135 | 21.1 | 1.73 | — | B |
| Comp. Example 7 | 100 | — | — | — | — | 121 | 10.2 | 1.89 | — | reference |

Note)
PheMI = N-phenylmaleimide,
CyMI = N-cyclohexylmaleimide,
BzMA = N-benzylmaleimide,
EtMI = N-ethylmaleimide,
iPrMI = N-isopropylmaleimide,
CHMA = cyclohexyl methacrylate Note)
A: equivalent to PMMA,
B = worse than PMMA The acrylic thermoplastic resins obtained in Examples 1 to 16 are equivalents that fall within the range of the present invention and achieved high heat resistance with good weather resistance and low water absorbency. On the other hand, the acrylic thermoplastic resins obtained in Comparative Examples 1 to 6 were insufficient in weather resistance and low water absorbency although having heat resistance.

It was additionally confirmed that the resin composition ratios of the acrylic thermoplastic resins obtained in Examples 1 to 16 were controlled by the charged raw material composition ratios of the reaction solutions.

Examples 17 and 18

With reference to Example 1, acrylic thermoplastic resins different in the amount of remaining volatile contents were prepared and subjected to compression press at 250° C. for two minutes. The color change thereof was observed. The measurement results are shown in Table 2.

TABLE 2

Remaining Volatile Contents and Staining by Heating

| | Thermoplastic resin | Remaining volatile content (wt %) | Transparency | Color |
|---|---|---|---|---|
| Example 17 | Example 1 | 0.43 | yes | colorless |
| Example 18 | | 0.85 | yes | pale yellow |

It was confirmed that staining by heating was not observed when the remaining volatile content was not more than 0.5% by mass with respect to the acrylic thermoplastic resin.

Examples 19 to 26, Comparative Examples 8 to 14, Reference Example 3

The acrylic thermoplastic resins obtained in Examples 1 to 16, Comparative Examples 1 to 7, and Reference Example 1 were used to form press films according to the method (1-a) above. The press films were formed into 100% drawn films according to the method (1-b) above, and the optical properties thereof were evaluated. The measurement results are shown in Table 3.

TABLE 3

Optical Film Characteristics (uniaxial free-width 100% drawing, values converted in terms of 100 μm)

| No. | Thermoplastic resin | Tg (° C.) | Drawing temperature (° C.) | Photoelastic coefficient/ $\times 10^{-12}$ Pa$^{-1}$ | Re/ nm | Rth/ nm | Light transmittance/% | Optical properties |
|---|---|---|---|---|---|---|---|---|
| Example 19 | Example 1 | 135 | 155 | +0.4 | −0.9 | −2.6 | 92.5 | AA |
| Example 20 | Example 2 | 135 | 155 | −0.3 | −2.3 | −2.6 | >85 | AA |
| Example 21 | Example 3 | 137 | 157 | +1.5 | −1.3 | −1.8 | >85 | AA |
| Example 22 | Example 4 | 146 | 166 | −1.4 | +14.6 | — | >85 | A |
| Example 23 | Example 5 | 148 | 168 | +3.0 | +17.0 | — | >85 | A |
| Example 24 | Example 6 | 140 | 160 | +3.0 | −0.6 | — | >85 | AA |
| Example 25 | Example 7 | 130 | 150 | −3.0 | −20.0 | — | >85 | A |
| Example 26 | Example 8 | 130 | 150 | −1.0 | −19.0 | — | >85 | A |
| Example 27 | Example 9 | 135 | 155 | +0.2 | −0.4 | — | >85 | AA |
| Example 28 | Example 10 | 130 | 150 | −0.6 | −18.9 | — | >85 | A |
| Example 29 | Example 11 | 135 | 155 | +1.7 | −9.7 | — | >85 | AA |
| Example 30 | Example 12 | 141 | 161 | +0.1 | −24.0 | — | >85 | A |
| Example 31 | Example 13 | 126 | 146 | +2.9 | +20.7 | — | >85 | A |
| Example 32 | Example 14 | 128 | 148 | +0.5 | −7.3 | — | >85 | A |
| Example 33 | Example 15 | 131 | 151 | +0.6 | −5.3 | — | >85 | A |
| Example 34 | Example 16 | 129 | 149 | +0.2 | −10.5 | — | >85 | A |
| Comp. Example 8 | Comp. Example 1 | 176 | 196 | +15.2 | +16.3 | — | >85 | B |
| Comp. Example 9 | Comp. Example 2 | 132 | 152 | +0.5 | −19.9 | — | >85 | B |
| Comp. Example 10 | Comp. Example 3 | 141 | 161 | +4.2 | −0.9 | — | 92.4 | B |
| Comp. Example 11 | Comp. Example 4 | 163 | 183 | +0.3 | +53.3 | — | >85 | B |
| Comp. Example 12 | Comp. Example 5 | 129 | 149 | −4.3 | −19.0 | — | >85 | B |
| Comp. Example 13 | Comp. Example 6 | 135 | 155 | −3.1 | −2.3 | — | 91.8 | B |
| Comp. Example 14 | Comp. Example 7 | 121 | 141 | −4.7 | −36.0 | — | 92.6 | B |
| Reference Example 3 | Reference Example 1 | 141 | 161 | −0.6 | +3.3 | +1.6 | 90.0 | AA |

In Table 3, the results of evaluation with the following criteria are shown in the fields of optical properties: AA: the absolute value of photoelastic coefficient is not greater than $3.0\times10^{-12}$ Pa$^{-1}$ and the absolute value of in-plane retardation (Re) is not greater than 11 nm, A: the absolute value of photoelastic coefficient is not greater than $3.0\times10^{-12}$ Pa$^{-1}$ and the absolute value of in-plane retardation (Re) is not greater than 30 nm, and B: the absolute value of photoelastic coefficient exceeds $3.0\times10^{-12}$ Pa$^{-1}$ or the absolute value of in-plane retardation (Re) exceeds 30 nm.

It was confirmed that the optical films obtained from the acrylic thermoplastic resins of Examples had extremely small absolute values of retardation and photoelastic coefficient as optical properties. In particular, it is understood that the optical properties of the optical films of Examples 19 to 21, 24, 27, 29, and 32 to 34 are such that the retardation is "zero" and the photoelastic coefficient is also "zero," that is, zero-zero birefringence. On the other hand, the optical films of acrylic thermoplastic resins of Comparative Examples are inferior in optical properties, for example, in that the absolute value of retardation is large or the absolute value of photoelastic coefficient is large.

The measurement results excerpted from Table 3 are shown in Table 4.

resin composition. The description thereof includes that a) N-phenylmaleimide and N-cyclohexylmaleimide are preferably used in combination in order to achieve good phase solubility of the copolymer with the rubber-modified thermoplastic resin, and that b) in order to obtain excellent transparency of the resin composition, the refractive index difference between the matrix portion mainly composed of the copolymer and the rubber portion (refractive index 1.517) is controlled to not greater than 0.01 by adjusting the refractive index of the copolymer by means of the resin composition.

On the other hand, the operation effects of the present invention are related to precise control of the optical properties (retardation and photoelastic coefficient) not disclosed in Japanese Patent Publication No. 4424636 described above. In fact, although the acrylic thermoplastic resins of Examples have a constant average refractive index of about 1.500 (refractive index error ±0.01) as shown in Table 4, it can be confirmed that only the optical properties (retardation and photoelastic coefficient) are precisely controlled with the resin compositions appropriately selected. In Example of Japanese Patent Publication No. 4424636, only a quarter-polymer of methyl methacrylate/N-phenylmaleimide/N-cyclohexylmaleimide/styrene is disclosed as a resin that satisfies the refractive index of the rubber portion (refractive index

TABLE 4

Optical Film Characteristics (uniaxial free-width 100% drawing, values converted in terms of 100 μm)

| No. | Thermoplastic resin | Composition (wt %) | | | Tg (°C.) | Photoelastic coefficient/ ×10$^{-12}$ Pa$^{-1}$ | Re/ nm | Rth/ nm | Average refractive index | Light transmittance/% | Optical properties |
|---|---|---|---|---|---|---|---|---|---|---|---|
| | | MMA | PheMI | CyMI | | | | | | | |
| Comp. Example 13 | Comp. Example 6 | 78 | 0 | 22 | 135 | −3.1 | −2.3 | — | 1.494 | 91.8 | B |
| Example 20 | Example 2 | 79 | 6 | 15 | 135 | −0.3 | −2.3 | −2.6 | 1.499 | >85 | AA |
| Example 19 | Example 1 | 81 | 8 | 11 | 135 | +0.4 | −0.9 | −2.6 | 1.501 | 92.5 | AA |
| Example 21 | Example 3 | 77 | 10 | 12 | 137 | +1.5 | −1.3 | −1.8 | 1.503 | >85 | AA |
| Comp. Example 10 | Comp. Example 3 | 81 | 19 | 0 | 141 | +4.2 | −0.9 | — | 1.508 | 92.4 | B |
| Comp. Example 14 | Comp. Example 7 | 100 | 0 | 0 | 121 | −4.7 | −36.0 | — | 1.490 | 92.6 | B |

It can be confirmed that (i) the acrylic thermoplastic resins of Examples are excellent in optical properties because methyl methacrylate, the N-substituted maleimide monomer (a) such as N-phenylmaleimide, and the N-substituted maleimide monomer (b) such as N-cyclohexylmaleimide are contained as essential monomer units, and that (ii) photoelastic coefficient and retardation are adjusted depending on the molar ratio between the repeating unit derived from the N-substituted maleimide monomer (a) and the repeating unit of the N-substituted maleimide monomer (b).

Japanese Patent Publication No. 4424636 discloses that a composition of a copolymer composed of a methacrylate unit, an arylmaleimide unit, an alkylmaleimide unit, and 0 to 20% by mass of other monomer unit, and a rubber-modified thermoplastic resin is a transparent heat-resistant thermoplastic 1.517), and it is suggested that the copolymer should contain styrene in addition to the three components as essential constituent elements.

Examples 35 and 36, Reference Example 4, Comparative Example 15

The acrylic thermoplastic resins obtained in Examples 1 and 9, Reference Example 1 and Comparative Example 7 were used to form press films according to the method (1-a) above. The press films were formed into 100%, 200%, and 300% drawn films according to the method (1-b) above, and the optical properties thereof were evaluated. The rates |K| of birefringence change were derived from the obtained optical property values by least squares approximation. The results are shown in Table 5.

TABLE 5

Optical Properties and Optical Property Change by Molding

| | | Example 35 (Example 1) | | | | Example 36 (Example 9) | | | | Reference Example 4 (Reference Example 1) MMA/St/MAH/BzMA | | | | Comp. Example 15 (Comp. Example 7) PMMA | | |
|---|---|---|---|---|---|---|---|---|---|---|---|---|---|---|---|---|
| Drawing conditions | Temperature/°C | — | 155 | 155 | 155 | — | 155 | 155 | 155 | — | 162 | 162 | 162 | — | 140 | 140 |
| | Ratio/% | 0 | 100 | 200 | 300 | 0 | 100 | 200 | 300 | 0 | 100 | 200 | 300 | 0 | 100 | 200 |
| Film characteristics (in terms of 100 µm) | Intrinsic birefringence, negative or positive | | negative | | | | negative | | | | positive | | | | negative | |
| | Re/nm (@550 nm) | 0.0 | −0.9 | −4.5 | −9.9 | 0.0 | −0.4 | −1.0 | −2.8 | 0.7 | 3.3 | 5.4 | 6.7 | −1.0 | −37 | −67 |
| | Absolute value of birefringence ($\times 10^{-5}$ @550 nm) | 0.0 | 0.9 | 4.5 | 9.9 | 0.0 | 0.4 | 1.0 | 2.8 | 0.7 | 3.3 | 5.4 | 6.7 | 1.0 | 37 | 67 |
| | Rate $|K|$ of birefringence change | | $0.03 \times 10^{-5}$ | | | | $0.01 \times 10^{-5}$ | | | | $0.02 \times 10^{-5}$ | | | | $-0.33 \times 10^{-5}$ | |
| | Rth/nm (100% drawing) | | −2.6 | | | | — | | | | +1.6 | | | | — | |
| | Photoelastic coefficient/$\times 10^{-12}$ Pa$^{-1}$ | | +0.4 | | | | +0.2 | | | | −0.6 | | | | −4.7 | |
| Glass transition temperature/°C | | | 135.0 | | | | 135 | | | | 136 | | | | 121 | |
| Heat resistance, low birefringence, low photoelasticity | | | A | | | | A | | | | A | | | | B | |

In Table 5, low birefringence and low photoelasticity were evaluated with the following criteria: A: the photoelastic coefficient is not greater than $3.0 \times 10^{-12}$ Pa$^{-1}$, the rate $|K|$ of birefringence change is not greater than $0.30 \times 10^{-6}$, and the absolute value of in-plane retardation (Re) is not greater than 11 nm, and B: the photoelastic coefficient exceeds $3.0 \times 10^{-12}$ Pa$^{-1}$, the rate $|K|$ of birefringence change exceeds $0.30 \times 10^{-6}$, or the absolute value of in-plane retardation (Re) exceeds 30 nm.

Based on the results shown in the Table, it was confirmed that the optical properties of the optical films made of the acrylic thermoplastic resins of the present invention are less affected by orientation as a result of drawing. This fact means that drawing for increasing the optical film strength does not cause a birefringence change.

Example 37

Using an acrylic thermoplastic resin obtained by the same procedure as in Example 1, extrusion-molding was carried out while adjusting the in-cylinder resin temperature and T-die temperature of a T-die equipped extruder (KZW15TW-25MG-NH model, with a T-die of 150 mm in width, lip thickness of 0.5 mm) manufactured by TECHNOVEL Corp. The obtained extruded film was formed according to the method (1-b) above into 100%, 200%, and 300% drawn films, and the optical properties thereof were evaluated. The rates $|K|$ of birefringence change were derived from the obtained optical property values by least squares approximation. The results are shown in Table 6.

TABLE 6

Optical Properties and Optical Property Change by Molding

| No. | | Example 37 | | | |
|---|---|---|---|---|---|
| Thermoplastic resin | | (Example 1) | | | |
| Drawing conditions | Temperature/°C | — | 151 | 151 | 151 |
| | Ratio/% | 0 | 100 | 200 | 300 |
| Film characteristics (in terms of 100 µm) | Intrinsic birefringence, negative or positive | | positive | | |
| | Re/nm (@550 nm) | +0.1 | −0.4 | −1.1 | −3.0 |
| | Absolute value of birefringence ($\times 10^{-5}$ @550 nm) | 0.1 | 0.4 | 1.1 | 3.0 |
| | Rate $|K|$ of birefringence change | | $0.01 \times 10^{-5}$ | | |
| | Rth/nm (100% drawing) | | — | | |
| | Photoelastic coefficient/$\times 10^{-12}$ Pa$^{-1}$ | | +0.2 | | |
| Glass transition temperature/°C | | 131 | | | |
| Heat resistance, low birefringence, low photoelasticity | | A | | | |

In Table 6, heat resistance, low birefringence, and low photoelasticity were determined with similar criteria as in Table 5. Based on these experimental results, the optical film made of the acrylic thermoplastic resin of the present inven- Example 38, Reference Example 5

The durability of the optical properties against humidity and heat was evaluated according the method described above using the 100% drawn films of Example 13 and Reference Example 3.

The measurement results are shown in Table 7.

TABLE 7

| Optical Property Change (Re/nm) under Temperature of 80° C. and Humidity of 99% RH | | | | | |
|---|---|---|---|---|---|
| | Film attribute | \multicolumn{3}{c}{Elapsed time (hr)} | Durability |
| | | 0 | 504 | 1008 | |
| Example 38 | Example 13 | +0.4 | +0.3 | +0.3 | A |
| Reference Example 5 | Reference Example 3 | +3.3 | −50.6 | −37.2 | B |

Test film: 100% uniaxial free-width drawn film
Re: in-plane direction retardation Re in terms of 100 μm In Table 7, the durability was evaluated with the following criteria: A: The amount of change in absolute value of retardation (Re) is not greater than 10 nm, and B: the amount of change in absolute value of retardation (Re) exceeds 10 nm.

It is understood that the optical film made of the acrylic thermoplastic resin of the present invention or the acrylic thermoplastic resin composition is excellent in durability because the optical property thereof (zero-zero birefringence) is maintained even after exposure in hot and humid conditions for 1000 hours.

Example 39, Comparative Example 16

Figure 2:
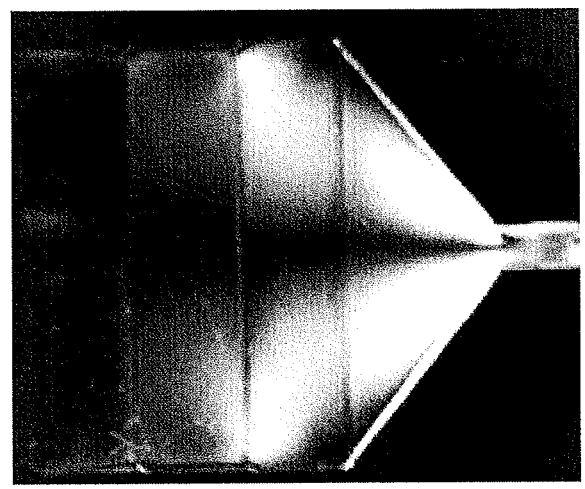
FIG. 2 shows a three-stage plate and crossed Nicols test results.
Figure 2:
Figure 2:
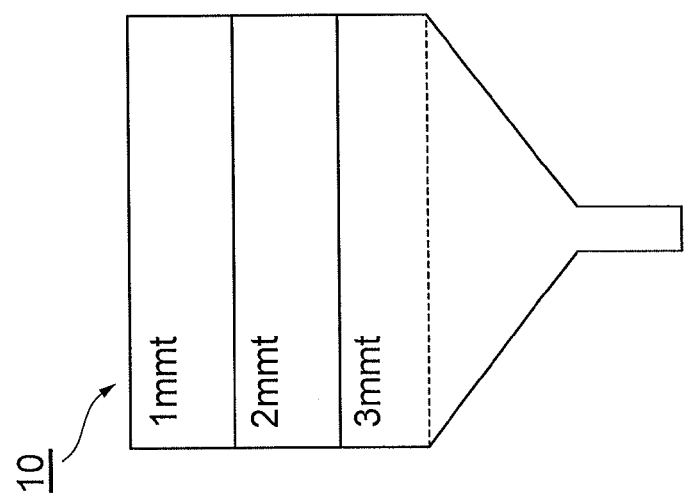

The acrylic thermoplastic resin obtained by performing the same procedure in Example 1 was used to mold a three-stage plate 10 shown in FIG. 2, having three thicknesses of 1 mm, 2 mm, and 3 mm, using an injection molder (manufactured by FUNAC CORPORATION; AUTO SHOT 15A) under the following conditions. The cylinder temperature was set to 230° C., 240° C., 240° C., and 240° C. in order from the hopper. The die temperature was set to 80° C., the injection time was set to 10 seconds, and the cooling time was set to 30 seconds. The molten resin was charged with a pressure 5 MPa higher than the exact injection pressure that allows the resin to be charged in the die. The optical properties of the resultant three-stage plate were evaluated. It was then confirmed that the retardation (Re) in the plate was less than 15 nm throughout the entire region.

The three-stage plate was evaluated according to a crossed Nicols test in which a test piece was placed on two polarizing plates orthogonal to each other and whether transmitted light (whether light is leaked) was observed. Additionally, as Comparative Example 16, a three-stage plate obtained by injection-molding the acrylic thermoplastic resin obtained in Comparative Example 7 in a similar process in the Example above was evaluated.

In FIG. 2, (a) and (b) are photographs showing the results of the crossed Nicols test for Example 39 and Comparative Example 16, respectively. In general, in injection molding, stress strain produced in a flow of polymer chain in the vicinity of the gate during molding is inevitable, and as a result, light leakage resulting from (photoelastic) birefringence easily occurs. However, as shown in FIG. 2, it was confirmed that such light leakage was not observed in the three-stage plate made of the acrylic thermoplastic resin according to the present invention. It follows that the acrylic thermoplastic resin according to the present invention is a suitable material for injection-molded objects such as lenses, pickup lenses, and lens arrays that require low birefringence and optical homogeneity.

As described above, it is confirmed that the optical film made of the acrylic thermoplastic resin of the present invention or the acrylic thermoplastic resin composition has excellent heat resistance and high optical isotropy (an extremely small birefringence value and an extremely small photoelastic coefficient) that cannot be achieved by the existing resins. It is also confirmed that the amount of birefringence change is extremely small when the resin is formed in a film or optically drawn for increasing the film strength.

This feature is extremely advantageous in industrial applications in that (orientation) birefringence attributable to polymer chain orientation due to a flow in melt molding does not occur during molding and drawing, and in that (photoelastic) birefringence attributable to remaining stress during molding or external forces does not occur. These characteristics are suitable in the application of polarizing plate protective films.

INDUSTRIAL APPLICABILITY

The acrylic thermoplastic resin of the present invention and the acrylic thermoplastic resin composition have excellent transparency with good heat resistance, weather resistance, and low water absorbency, and with birefringence thereof being highly controlled, and therefore suitably used as optical materials, for example, for polarizing plate protective films used in liquid crystal displays, plasma displays, organic EL displays, field emission displays, and displays for rear projection televisions, retarder plates such as quarter wave plates and half wave plates, optical compensation films for liquid crystals such as viewing angle control films, display front panels, display substrates, and lenses, as well as transparent substrates and transparent conductive substrates used in touch panels and solar cells, etc.

Other usage includes waveguides, lenses, lens arrays, optical fibers, covering material for optical fibers, LED lenses, lens covers, etc., in the fields of optical communication, optical switching, and optical measurement systems.

REFERENCE SINGS LIST

10 three-stage plate

The invention claimed is:

1. An acrylic thermoplastic resin comprising:
   50 to 95% by mass of a repeating unit (X) derived from a methacrylate monomer represented by the following Chemical Formula (1);
   0.1 to 20% by mass of a repeating unit (Y1) derived from an N-substituted maleimide monomer (a) represented by the following Chemical Formula (2); and
   0.1 to 49.9% by mass of a repeating unit (Y2) derived from an N-substituted maleimide monomer (b) represented by the following Chemical Formula (3) regarding the total amount of the repeating unit (X), the repeating unit (Y1), and the repeating unit (Y2) as 100% by mass:

Chemical Formula (1)

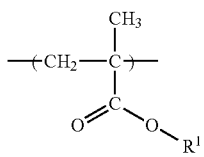

where R¹ represents a chemical group selected from the group consisting of a hydrogen atom, a linear or branched alkyl group having 1 to 12 carbon atoms, a cycloalkyl group having 5 to 12 carbon atoms, an aryl group having 6 to 14 carbon atoms, and an aryl group having 6 to 14 carbon atoms and having a substituent; R¹ in the same molecule being the same or different; the substituent of the aryl group being one selected from the group consisting of a halogen atom, a hydroxyl group, a nitro group, a linear or branched alkoxy group having 1 to 12 carbon atoms, and a linear or branched alkyl group having 1 to 12 carbon atoms, Chemical Formula (2)

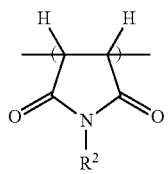

where R² represents an aryl group having 6 to 14 carbon atoms or an aryl group having 6 to 14 carbon atoms and having a substituent; R² in the same molecule being the same or different; the substituent of the aryl group being one selected from the group consisting of a halogen atom, a hydroxyl group, a nitro group, a linear or branched alkoxy group having 1 to 12 carbon atoms, and a linear or branched alkyl group having 1 to 12 carbon atoms, and

[Chemical Formula 3]

formula (3)

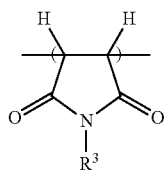

where R³ represents a chemical group selected from the group consisting of a hydrogen atom, a linear or branched alkyl group having 1 to 12 carbon atoms, an alkyl group having 1 to 12 carbon carbon atoms and having a substituent, and a cycloalkyl group having 3 to 12 carbon atoms; R³ in the same molecule being the same or different; the substituent of the alkyl group being one selected from the group consisting of a halogen atom, a hydroxyl group, a nitro group, and a linear or branched alkoxy group having 1 to 12 carbon atoms, wherein:
the absolute value of a photoelastic coefficient (C) is not greater than $3.0 \times 10^{-12}$ Pa$^{-1}$,
the halogen atom content is less than 0.47% by mass with reference to the mass of the acrylic thermoplastic resin and the acrylic thermoplastic resin satisfies the following optical property (i):
(i) the absolute value of retardation (Re) in an in-plane direction is not greater than 30 nm, where the retardation is a value obtained by converting a value measured from a film of the acrylic thermoplastic resin into a value in terms of a 100 μm thickness.

2. The acrylic thermoplastic resin according to claim 1, wherein a molar ratio of the content of the repeating unit (Y1) derived from an N-substituted maleimide monomer (a) to the content of the repeating unit (Y2) derived from an N-substituted maleimide monomer (b) is greater than 0 and not greater than 15.

3. The acrylic thermoplastic resin according to claim 1, wherein the repeating unit (X) derived from a methacrylate monomer is a repeating unit derived from methyl methacrylate or benzyl methacrylate, the repeating unit (Y1) derived from an N-substituted monomer (a) is a repeating unit derived from N-phenylmaleimide, and the repeating unit (Y2) derived from an N-substituted maleimide monomer (b) is a repeating unit derived from N-cyclohexylmaleimide.

4. The acrylic thermoplastic resin according to claim 1, wherein the acrylic thermoplastic resin has a weight-average molecular weight in a range of 3000 to 1000000 according to a GPC measurement method.

5. The acrylic thermoplastic resin according to claim 1, wherein the acrylic thermoplastic resin satisfies the following optical property:
a value of a slope K in an equation (A) of linear relationship between birefringence (Δn(S)) of a uniaxially drawn film of the acrylic thermoplastic resin and
a draw rate (S) determined by least squares approximation satisfying the following expression (B):

$$\Delta n(S) = K \times S + C, \text{ where } C \text{ is a constant that is a birefringence value when the film is not drawn} \quad (A)$$

$$|K| = \leq 0.30 \times 10^{-6} \quad (B)$$

where the birefringence is a value obtained by converting a value measured from the film of the acrylic thermoplastic resin into a value in terms of a 100-μm thickness.

6. The acrylic thermoplastic resin according to claim 1, wherein the acrylic thermoplastic resin satisfies the following optical property (ii):
(ii) the absolute value of retardation (Rth) in a thickness direction is not greater than 30 nm, where the retardation is a value obtained by converting a value measured from a film of the acrylic thermoplastic resin into a value in terms of a 100-μm thickness.

7. The acrylic thermoplastic resin according to claim 1, wherein the acrylic thermoplastic resin satisfies the following condition (iii):
(iii) glass transition temperature (Tg) is not lower than 120° C.

8. The acrylic thermoplastic resin according to claim 1, wherein the acrylic thermoplastic resin satisfies the following condition (iv):
(iv) total light transmittance is not lower than 85%.

9. A molded object comprising the acrylic thermoplastic resin according to claim 1.

10. A sheet or film comprising the molded object according to claim 9.

11. The sheet or film according to claim 10, wherein the sheet or film is molded by extrusion molding and drawn in at least a uniaxial direction with a draw rate of 0.1 to 300%.

12. The sheet or film according to claim 10, wherein the sheet or film is molded by solution cast molding and drawn in at least a uniaxial direction with a draw rate of 0.1 to 300%.

13. A polarizing plate protective film comprising the sheet or film according to claim 10.

14. A retarder film comprising the sheet or film according to claim 10.

15. A retarder plate comprising the sheet or film according to claim 10.

16. A transparent plastic substrate comprising the sheet or film according to claim 10.

17. A lens comprising the molded object according to claim 9.

18. The acrylic thermoplastic resin according to claim 1, wherein the content of the sum of the repeating unit (X), the repeating unit (Y1) and the repeating unit (Y2) is not less than 80% by mass with reference to the total mass of the acrylic thermoplastic resin.

* * * * *